United States Patent
Smith et al.

(10) Patent No.: US 7,778,801 B2
(45) Date of Patent: *Aug. 17, 2010

(54) AUTOMATED TEST SCRIPT FOR COMMUNICATIONS SERVER

(75) Inventors: Andrew Smith, Waterloo (CA); Baljeet Bilkhu, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/204,898

(22) Filed: Sep. 5, 2008

(65) Prior Publication Data

US 2009/0006497 A1    Jan. 1, 2009

Related U.S. Application Data

(63) Continuation of application No. 11/266,361, filed on Nov. 4, 2005, now Pat. No. 7,433,804.

(51) Int. Cl.
G06F 15/00 (2006.01)
G06F 17/30 (2006.01)
(52) U.S. Cl. .................... 702/186; 707/803
(58) Field of Classification Search ............... 702/186; 707/10, 803; 717/124
See application file for complete search history.

(56) References Cited

U.S. PATENT DOCUMENTS

| 5,243,519 | A | * | 9/1993 | Andrews et al. ............... 704/8 |
| 5,600,789 | A | | 2/1997 | Parker et al. |
| 6,522,995 | B1 | | 2/2003 | Conti et al. |
| 6,701,514 | B1 | | 3/2004 | Haswell et al. |
| 6,904,278 | B2 | | 6/2005 | Iyer |

FOREIGN PATENT DOCUMENTS

WO   03079216 A   9/2003

OTHER PUBLICATIONS

Frohnhoff, B., et al.: "An Advanced TMN Test System—TSE-P-", 1996 IEEE, NOMS, Kyoto, Apr. 15-19, 1996, vol. 2, Symp. 5, p. 444-453.
Canadian Patent Application No. 2,565,746 Office Action dated Dec. 2, 2009.

* cited by examiner

*Primary Examiner*—Bryan Bui
(74) *Attorney, Agent, or Firm*—Perry+Currier Inc.

(57) ABSTRACT

For use in a communication system having at least one enterprise server for facilitating communications and delivery of services to users of handheld mobile communication devices and an administrative program for managing the enterprise server, the improvement comprising an automated script for testing operation of the administration software by automatically executing operations and verifying results of these operations.

24 Claims, 46 Drawing Sheets

| SQL Server Enterprise Manager - [2:Data in Table 'UserConfig' in 'Andrew_BESMgmt' on 'TC36-SQLBES'] | | | | | | |
|---|---|---|---|---|---|---|
| Console Window Help | | | | | | |
| Id | SeverConfigId | GroupConfigId | DisplayName | UserName | DeviceType | PIN | Redi |
| | 1 | <NULL> | zzandrew15 | <NULL> | 0 | | 1 |
| * | | | | | | | |

FIG.6

| PIM Sync Field Mapping | | |
|---|---|---|
| Desktop Field | Device Field | |
| ☐ Address Book | | |
| Title | Title | |
| First Name | First Name | |
| Last Name | Last Name | |
| Middle Initial | Middle Initial | |
| Job Title | Job Title | |
| Company Name | Company | |
| Email1 Address | Email1 | |
| Email2 Address | Email2 | |
| Email3 Address | Email3 | |
| Business Address Street 1 | Address 1 | |
| Business Address Street 2 | Address 2 | |
| Business Address City | City | |
| Business Address State | State/Prov | |
| Business Address Country | Country | |
| Business Address Postal Code | Zip Code | |
| Business Fax Number | Fax | |

[OK] [Cancel]

FIG.7B

| zzandrew01 | | |
|---|---|---|
| Properties | ☐ Email Address | |
| ↑ Redirection | Email Address | zzandrew01@core.sqm.... |
| • Filters | ☐ Message Fowarding | |
| • Security | Redirect to Handheld | True |
| • IT Policy | Do not redirect when in cradle | True |
| • PIM Sync | Do Not Save Sent Messages | False |
| • Advanced | ☐ Auto Signature | |
| | Signature | |
| | ☐ Enable S/MIME Message Processing | |
| | Enable S/MIME Message Processing | False |

Redirection
Enables you to define message forwarding and signature settings for the user(s).

[ OK ]   [ Cancel ]   [ Apply ]

FIG.15B

AUTOMATED TEST SCRIPT FOR COMMUNICATIONS SERVER

CROSS-REFERENCE TO RELATED APPLICATION

This application is a continuation of U.S. patent application Ser. No. 11/266,361, filed Nov. 4, 2005, now issued U.S. Pat. No. 7,433,804, entitled "Automated Test Script for Communications Server".

FIELD

The following is directed in general to communication systems, and more particularly to an automated script for executing operations in a communications server in order to test server functionality.

BACKGROUND

Mobile communication devices are becoming increasingly popular for business and personal use due to a relatively recent increase in the number of services and features that the devices and mobile infrastructure support. Handheld mobile communication devices, sometimes referred to as mobile stations, are essentially portable computers having wireless capability, and come in various forms. These include Personal Digital Assistants (PDAs), cellular phones and smart phones equipped with receivers and transmitters for communicating over a wireless network.

In order to facilitate communications and manage delivery of services to users of handheld mobile communication devices in an enterprise, it is known to use one or more enterprise servers. These servers provide functionality and components that monitor services (such as provided by additional attachment servers, web servers, etc.) as well as process, route, compress and encrypt data for transmission to and from handheld devices connected to the wireless network.

It is also known in the art to execute an administration program on a remote computer for the purpose of managing one or more enterprise servers. Such administration programs are complex and difficult to test due to the large amount of data, options, menus, links, and operations that may be performed. Although many automated scripts have been developed to automate user interface testing (e.g. automated GUI testing scripts such as Squish 1.1 by froglogic), it has been found that verifying proper functioning of the administration program and its interactions with other components such as the enterprise server, configuration database, etc., is a daunting task, and there are many details that a tester may miss while attempting to test the program. Most testers do not have the time, nor the patience to ensure that each and every menu option is in the correct place, and that it responds correctly when selected or clicked. Similarly, testers typically do not have sufficient time and/or patience to check the configuration database and enterprise server log files each time they perform an action that causes changes in the files.

BRIEF DESCRIPTION OF THE DRAWINGS

A detailed description of the preferred embodiment is set forth in detail below, with reference to the following drawings, in which:

FIG. 2, comprising

FIG. 6 is a representation of a user interface window showing a new row created after adding a user.

FIG. 7B is a representation of a user interface window displayed after clicking on the task link in FIG. 7A.

FIG. 15B shows a property page for the user displayed after clicking the link.

DETAILED DESCRIPTION

Figure 1:
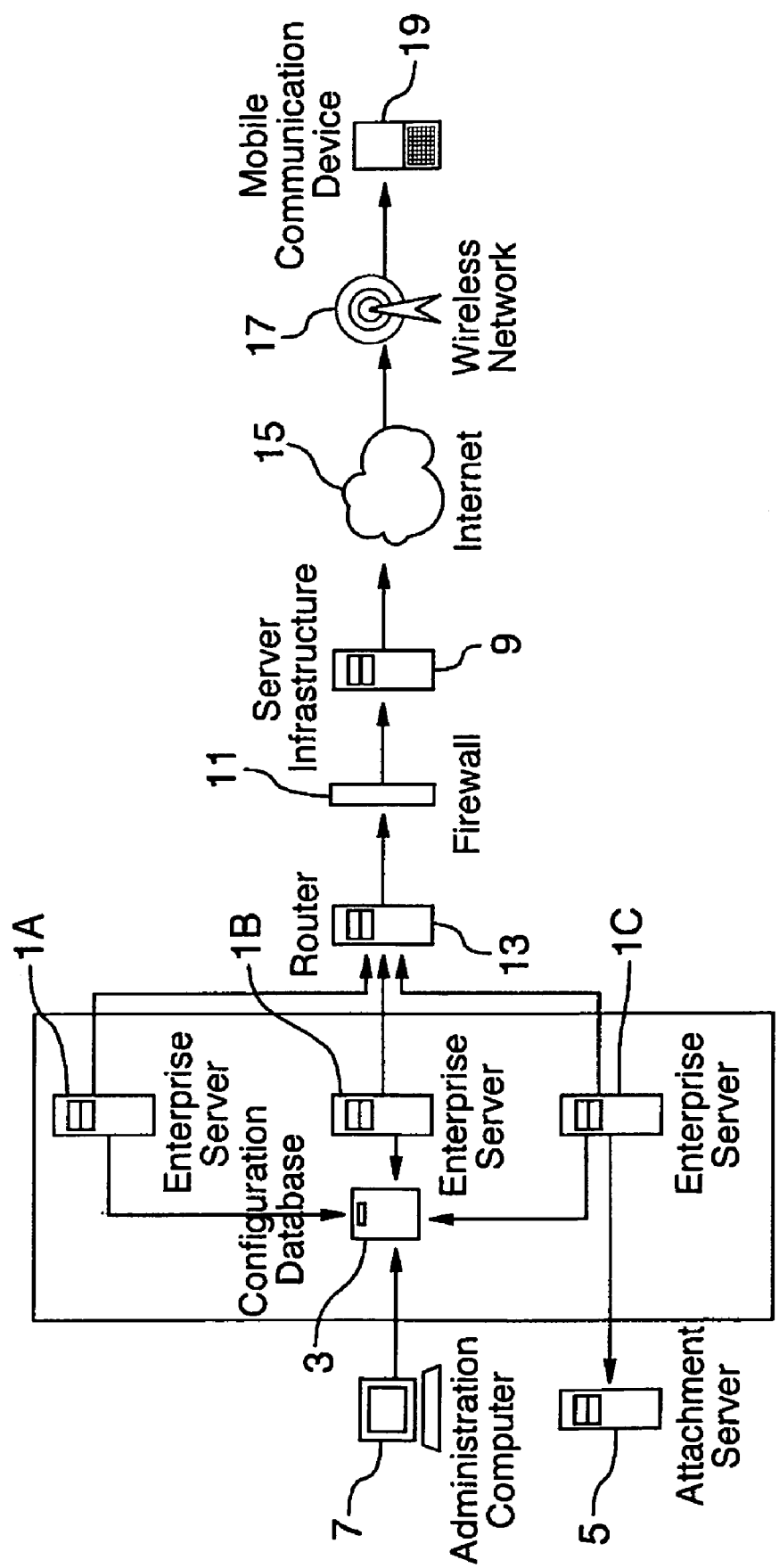
FIG. 1 is a block diagram showing a typical enterprise server architecture with remote components.
Figure 2A:
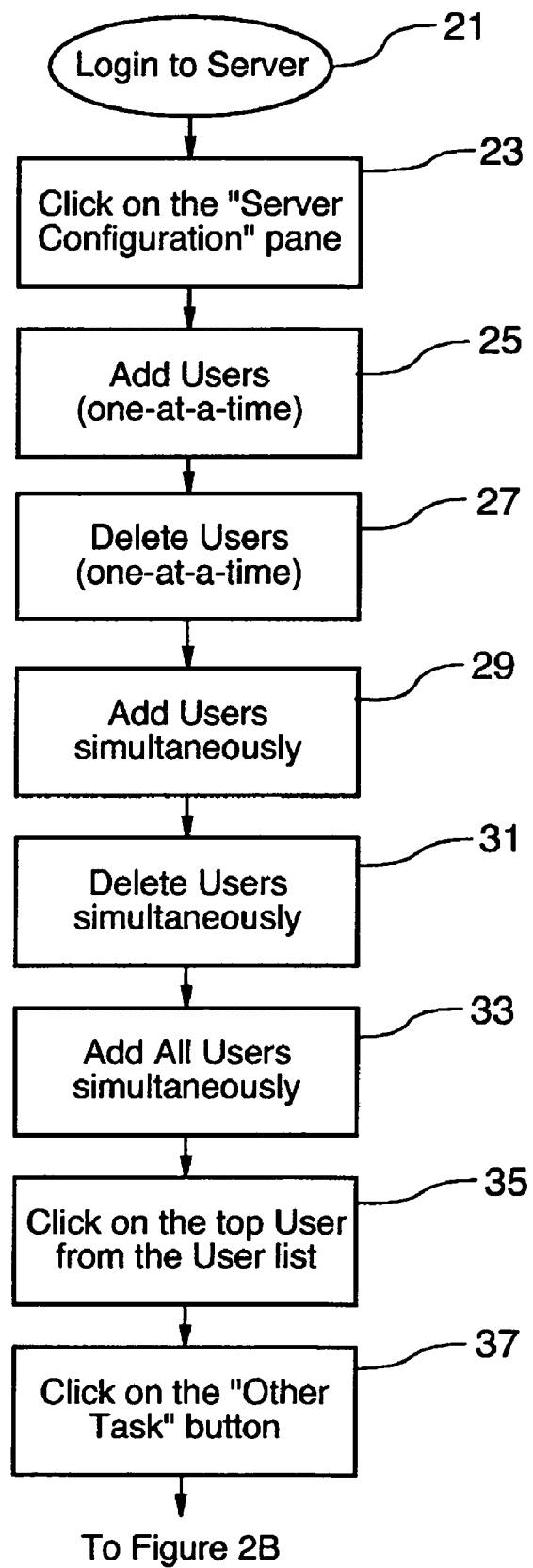
FIGS. 2A-2E, is a flowchart showing execution of the automated script of the preferred embodiment.
Figure 2B:
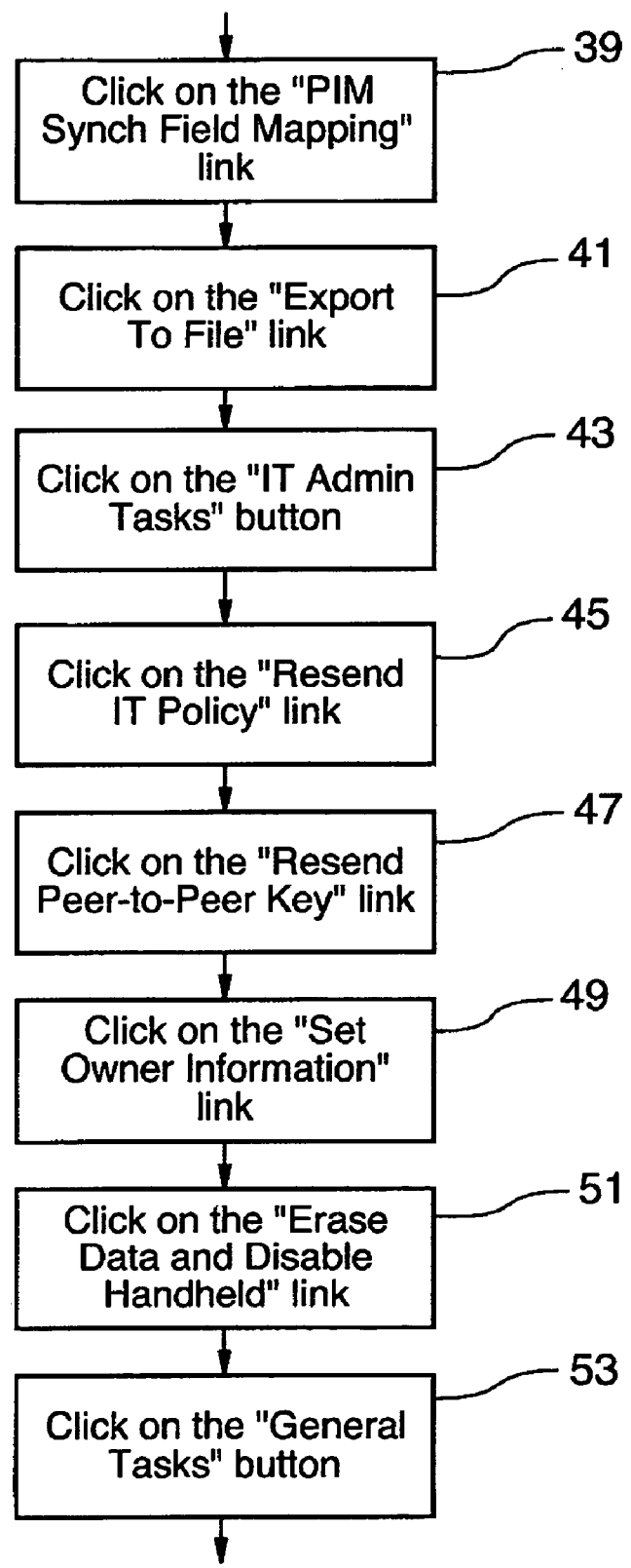
Figure 2C:
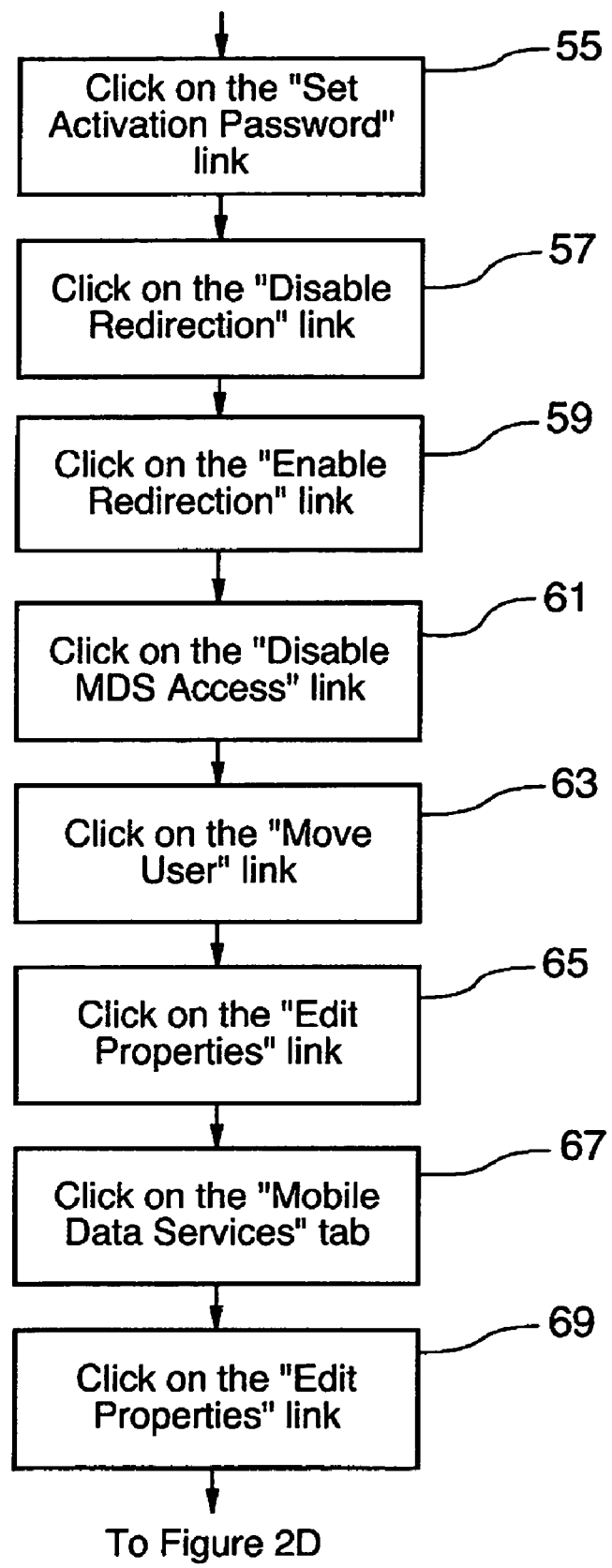
Figure 2D:
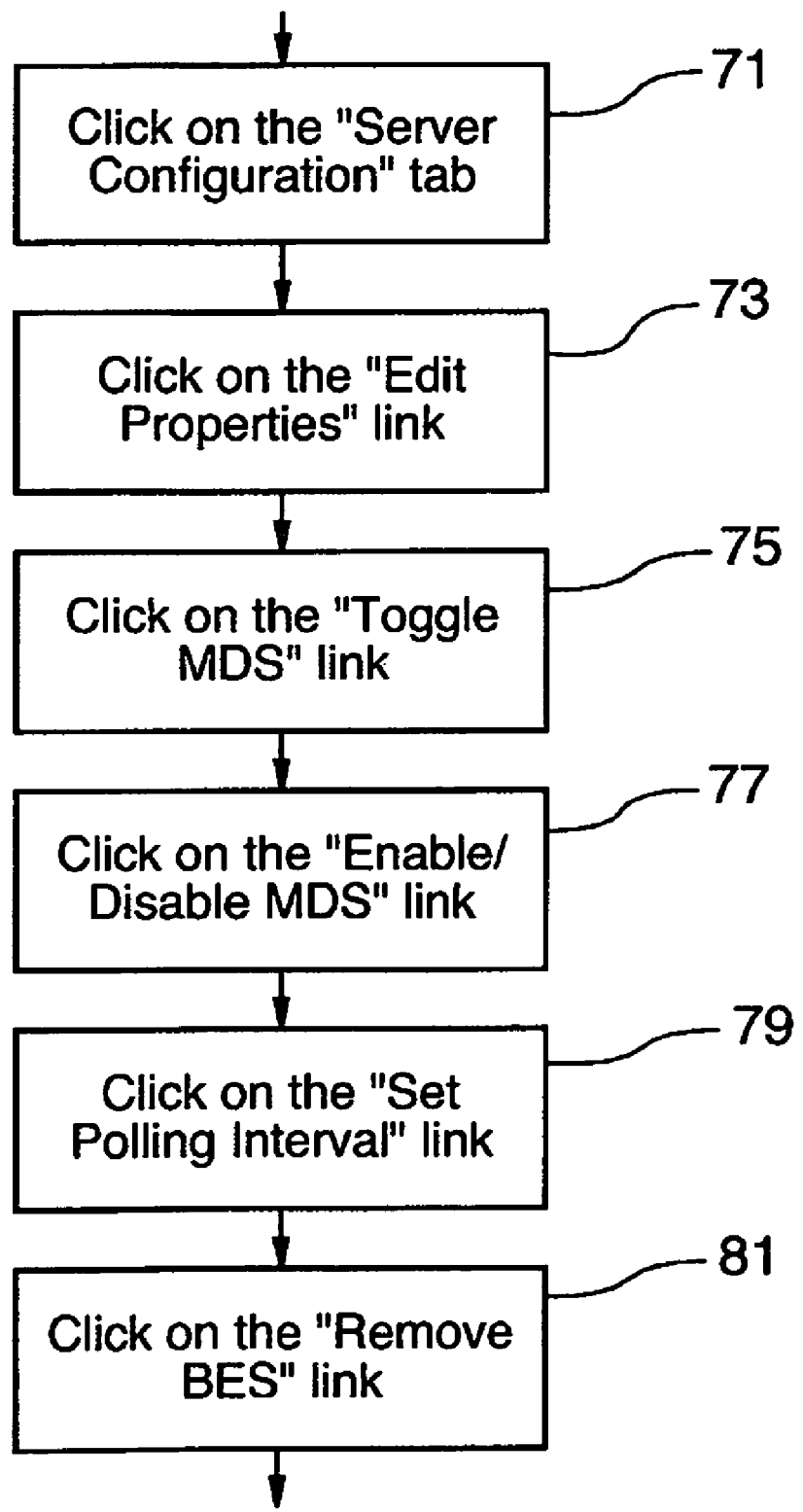
Figure 2E:
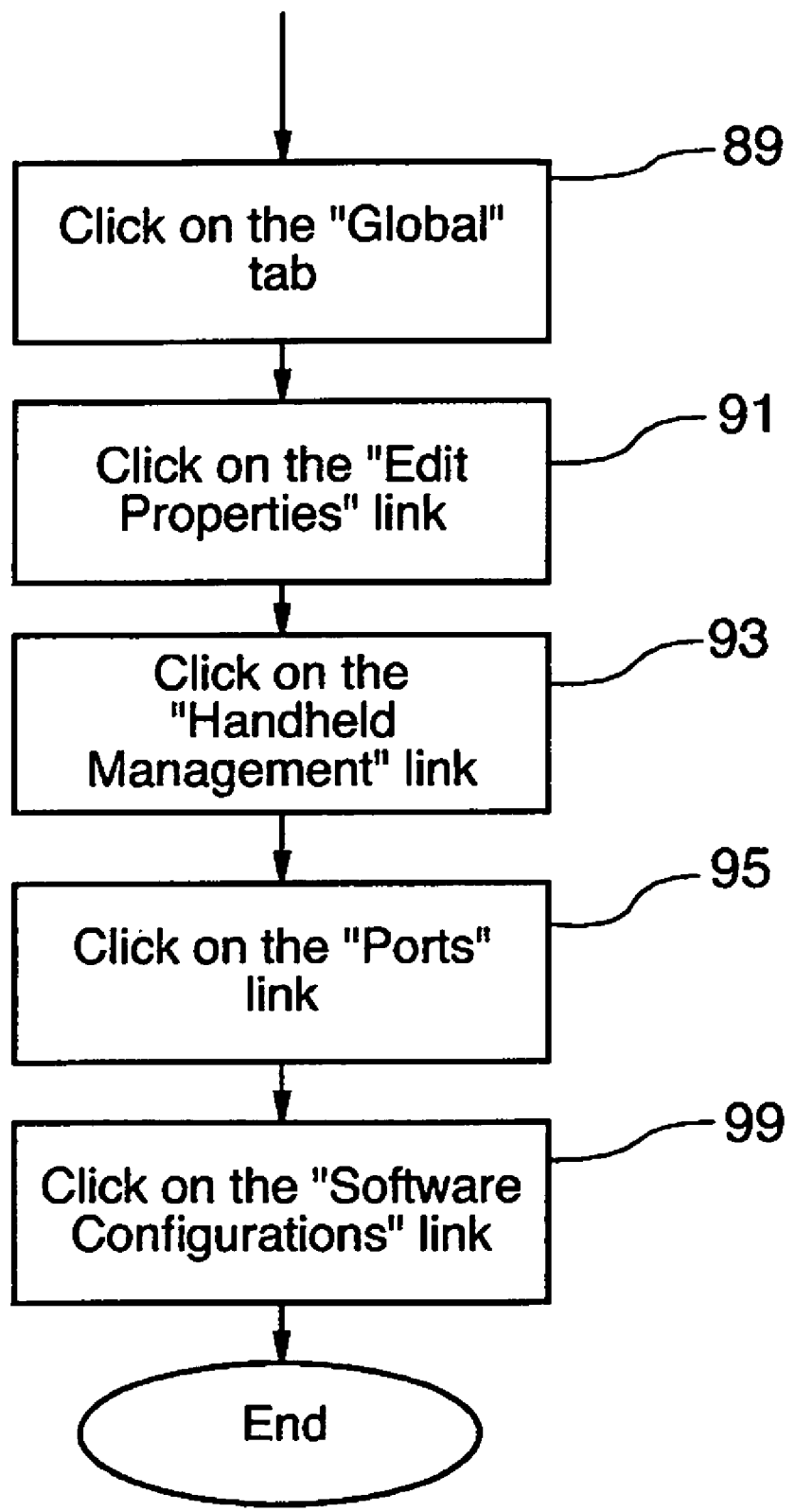

With reference to FIG. 1, a typical enterprise server configuration is shown with three enterprise servers 1A, 1B and 1C connected to a configuration database 3. Enterprise server 1C is also connected to an attachment server 5. An administration computer 7 executes administration software for managing operation of the multiple servers 1A, 1B and 1C in conjunction with the configuration database 3 (e.g. add, delete or move users, manage mobile data services, update owner information, re-synchronize encryption keys, etc.) The enterprise servers 1A, 1B and 1C connect to a server infrastructure 9, through firewall 11, using a router 13. The server infrastructure 9 is connected to the Internet 15 which, in turn, communicates with a plurality of hand-held mobile communication devices, such as device 17, via wireless network 19. Operation of the architecture shown in FIG. 1 would be well known to a person of ordinary skill in the art.

As set forth in greater detail below, test processes on the administration software may be automated thereby allowing testers to concentrate on other tasks while also increasing the coverage of testing and thereby verifying operational aspects of the administration software not hitherto possible.

More particularly, an automated script is set forth below that tests the administration software by executing operations on the computer 7, while exploring and verifying the content displayed and contained in the software user interface including data, menu options, buttons, and links. By exploring the user interface and performing operations, the script ensures that the interface buttons, menu, options, and links respond correctly when selected or clicked. While testing the user interface by performing actions such as adding a user to the enterprise server 1A, 1B or 1C, for example, the script ensures that the interface responds correctly to the action and also checks databases and log files to ensure that they are updated correctly. Although the embodiment set forth below conducts tests on a single on of the servers 1A, 1B or 1C, the principles disclosed herein may be applied to automated testing of all available configurations and functionality provided by the administration computer 7, including the testing of multiple servers from the same administration software.

According to the preferred embodiment, the automated script is implemented in the computer 7 using SQABasic scripting language, and is run from the Rational Robot playback utility by rational.com (Rational Robot automatically plays back scripts that emulate user actions interacting with the graphical user interface (GUI) of applications under test). In particular, the automated script uses built-in utilities of Rational Robot such as Object Data and Object properties verification points to collect data and verify contents. Results from all tests executed by the script are logged in a log file that can be examined by a human tester. Results for built-in verification points are viewable from Rational TestManager logs.

Several open-source library functions are also utilized to access data within the user interface of computer 7. The script preferably uses SQL to access the configuration database 3 to ensure it has been updated correctly in response to operations executed at the user interface. To access some of the data displayed by the interface that is not accessible through Rational's bulit-in capabilities, a Document Object Model (DOM) is used to parse HTML source code, as set forth in United States Patent Publication Number 20050108636, entitled System and Method of Retrieving and Presenting Partial (Skipped) Document Content, the contents of which are incorporated herein by reference. Object properties are also retrieved programmatically using "SQAGetProperty" (a built-in SQABasic function that allows object properties to be retrieved). Object data is retrieved programmatically via open source library functions. Although the embodiment set forth herein makes use of built-in verification points, it is contemplated that Built-in Object Property and Data verification points may be eliminated from the scripts since they introduce overhead, reduce efficiency and maintainability.

The automated script of the preferred embodiment is set forth in FIG. 2. It will be appreciated that the steps shown in FIG. 2 are not exhaustive and that the order of execution of the steps may vary. Moreover, the preferred embodiment is set forth in the context of testing functionality of an Enterprise Server using an administrative program running on computer 7. A person of skill in the art will appreciate that the script may be modified to test servers of other manufacturers and for other applications.

As discussed in greater detail below, the script calls respective ones of a plurality of modules to perform specific functions, including: "GetFileVersion", "RoboManagerrec", "deleteUsers", "verifyVersion", "verifyWindowConent", "checkSQDLB" and "checklog". Other modules may be used, as would be understood by one of skill in the art.

The "GetFileVersion" module may be obtained from the open source library "GetFileinfo" which is provided at http:/groups.yahoo.com/group/RationalUsers/files/Libraries/. In operation, the "GetFileVersion" function searches the remote computer 7 for components used by the administrative console (or program), and the executable of the administrative console itself. Additional components searched for include USB Kernel Driver, USB Channel Controller, Handheld Manager, Application Loader, and Programmer.

The function ("GetFileVersion") collects all of the version numbers of each component listed above, and populates variables within the script. Specifically, "GetFileVersion" retrieves versions of components and populates variables with their values. Variables are containers for the retrieved data (versions of components). Versions are stored in variables so they can be referenced later in the script when verifying version numbers displayed in "About Manager".

These variables are then tested against the data displayed by the administration software at the user interface of computer 7. For example, if the user clicks "Help>About . . . " within the user interface (FIG. 3A), data is displayed that indicates the components that are present on the machine and their version numbers. The data collected by the "GetFileVersion" function is compared against the data displayed in the user interface window using the "verify version" function.

Figure 4A:
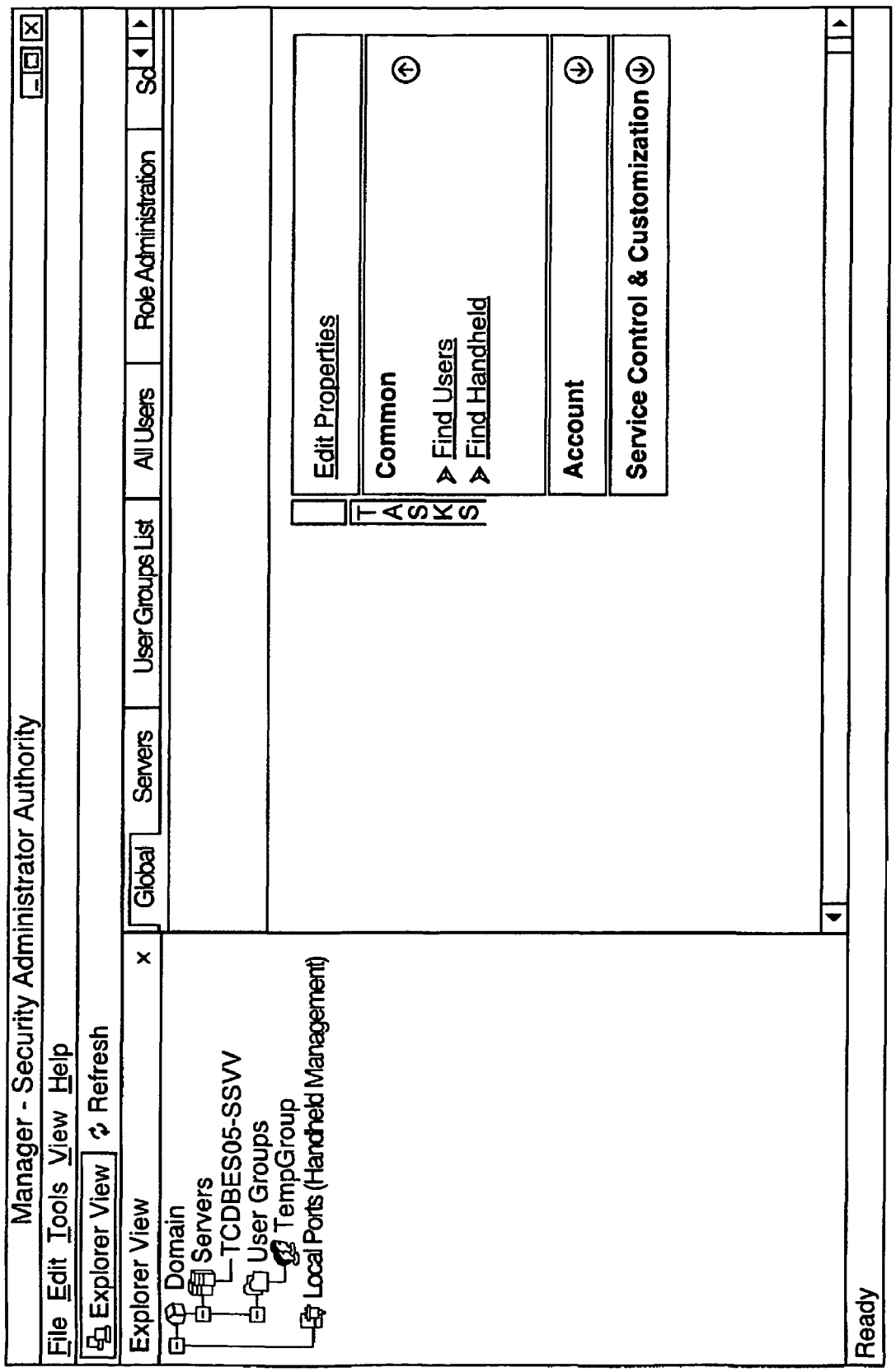
FIG. 4A is a representation of a user interface window showing a "Find User" link.

The "RoboManagerrec" script is available at "\\asmith-w2k-2.rim.com\Shared\BlackBerryManager2\TestDatastore\ DefaultTestScriptDatastore\TMS_Scripts". In operation, the script obtains a list of users by retrieving object data from the dialogue displayed when clicking "Find User" (FIG. 4A), or in the alternative can work from a list of predefined users provided in a data file. As the script initializes and reads data required for execution provided in an "mini" file (see Example, below), it also reads data from the file containing a list of users. An array of user names is created from the data file. The configuration database 3 is not utilized in creating the list.

The following represents sample contents of a data file with users to be used by script (user names appear on separate lines):

```
<snip>
zzandrew01
zzandrew02
zzandrew03
zzandrew04
zzandrew05
zzandrew06
zzandrew07
zzandrew08
zzandrew09
zzandrew10
zzandrew11
</snip>
```

The "RoboManager" script automatically adds users (from the list of users collected by the script) by clicking the "Add Users" link (FIG. 4B), and verifies that the users have been added correctly by examining the content of a User List displayed by the user interface, and data contained within the configuration database 3, and log files.

Figure 4B:
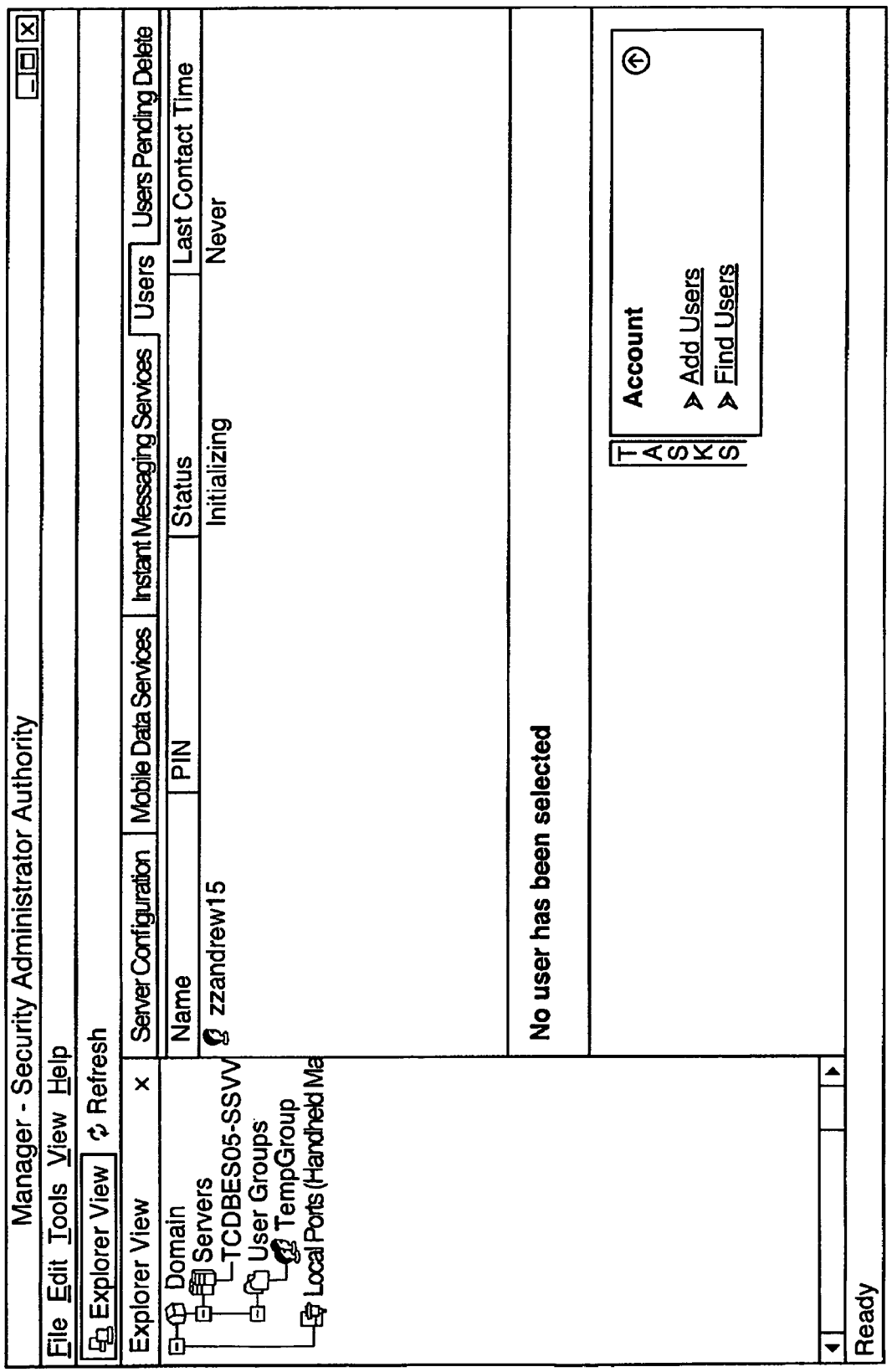
FIG. 4B is a representation of a user interface window showing an "Add User" link.
Figure 4C:
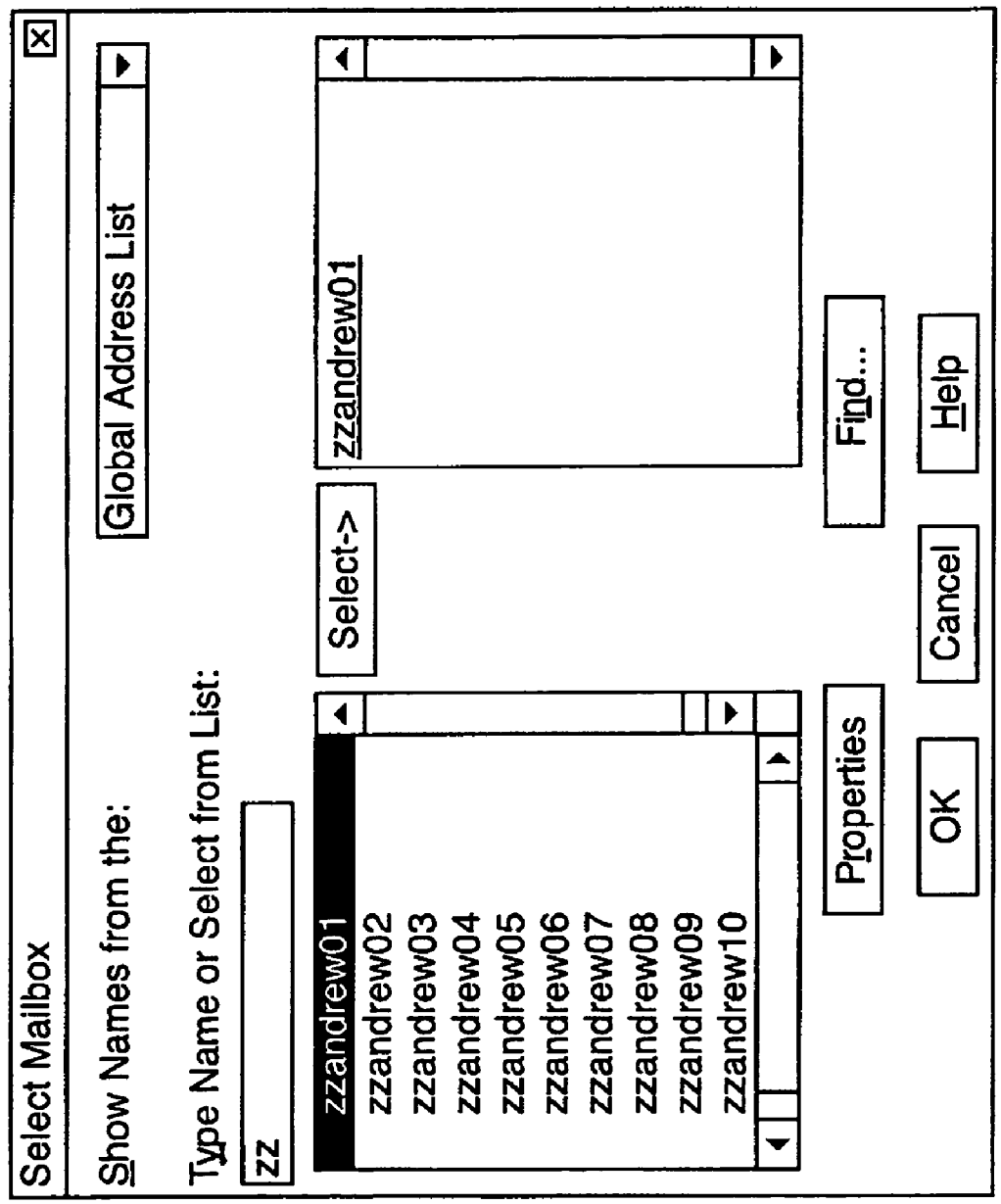
FIG. 4C is a representation of a user interface window showing a "Select Mailbox" window from which a user may be selected.
Figure 4D:
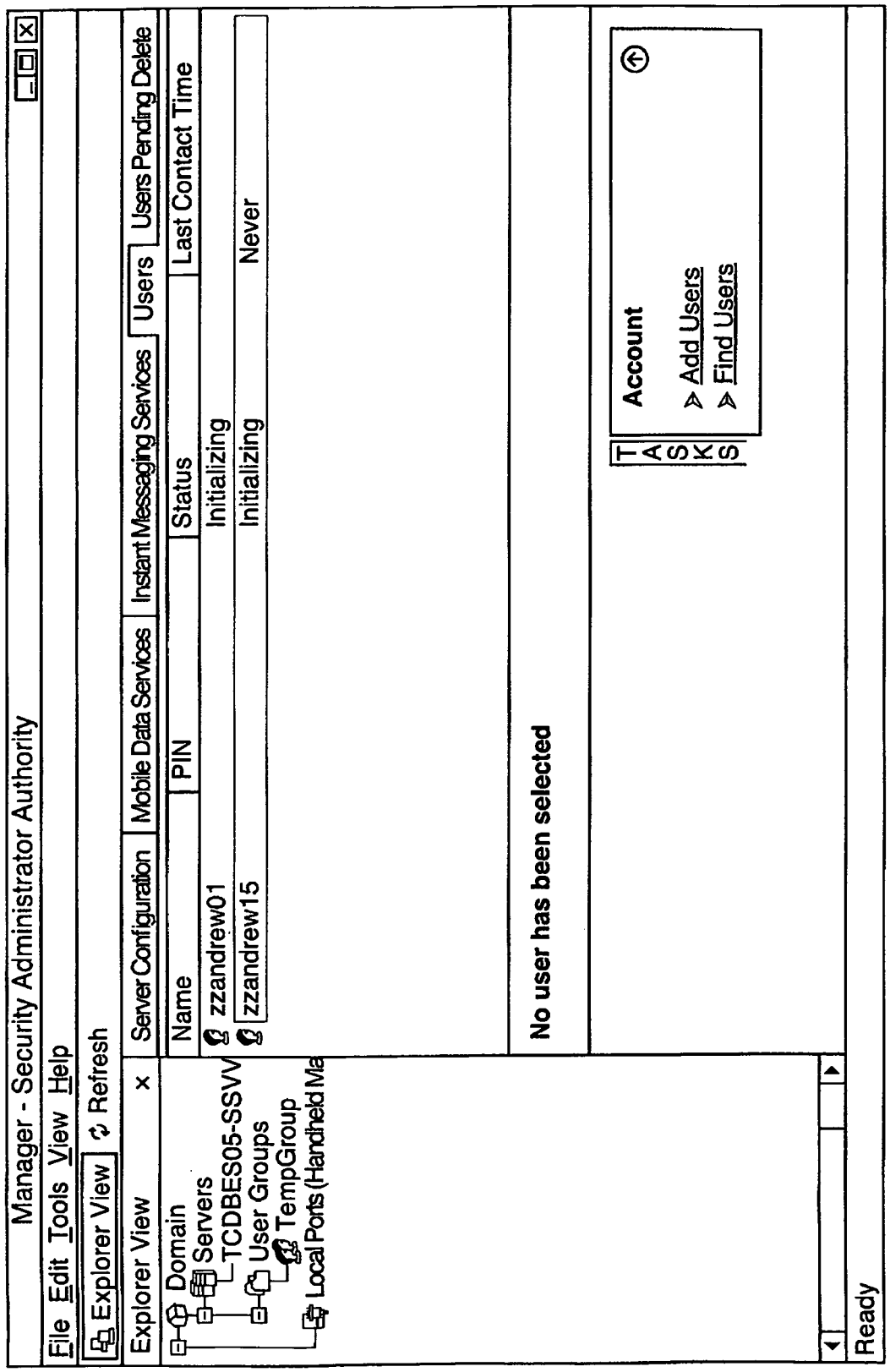
FIG. 4D is the representation of FIG. 4B with a new user added.

The user interface of FIG. 4B shows the "Users" tab which contains the "Add Users" link, and the list of users. The link is clicked by the "RoboManager" script and the "Select Mailbox" dialogue is displayed (FIG. 4C). The desired user (which is chosen from the array of user names populated previously) is selected by highlighting the name of the user and clicking the "Select" button, which adds the user to the list on the right. The script then pushes the "OK" button and the user is added to the list shown in FIG. 4D. The script then retrieves object data from the users list using open source utilities and verifies that the user added via "Add User" appears correctly in the list. Database queries are implemented to check appropriate tables to ensure they are updated correctly. Log file scanning is also implemented, as is well known in the art.

The "deleteUsers" function uses the list of users collected by the "RoboManagerrec" function, and verifies that the users have been successfully deleted by examining content displayed by the user interface, and data contained within the configuration database 3, and log files. When users are added, the script keeps track of which users have been added to the enterprise server 1A, 1B, etc. When "deleteUsers" is called, it removes all users that have been added. The script also keeps track of a list of users that are to be left on the enterprise server, which can be specified in the "mini" file. When "DeleteUsers" cycles through the list of users that have been added, it ensures they are not in the list of users to be left on the enterprise server.

Figure 5A:
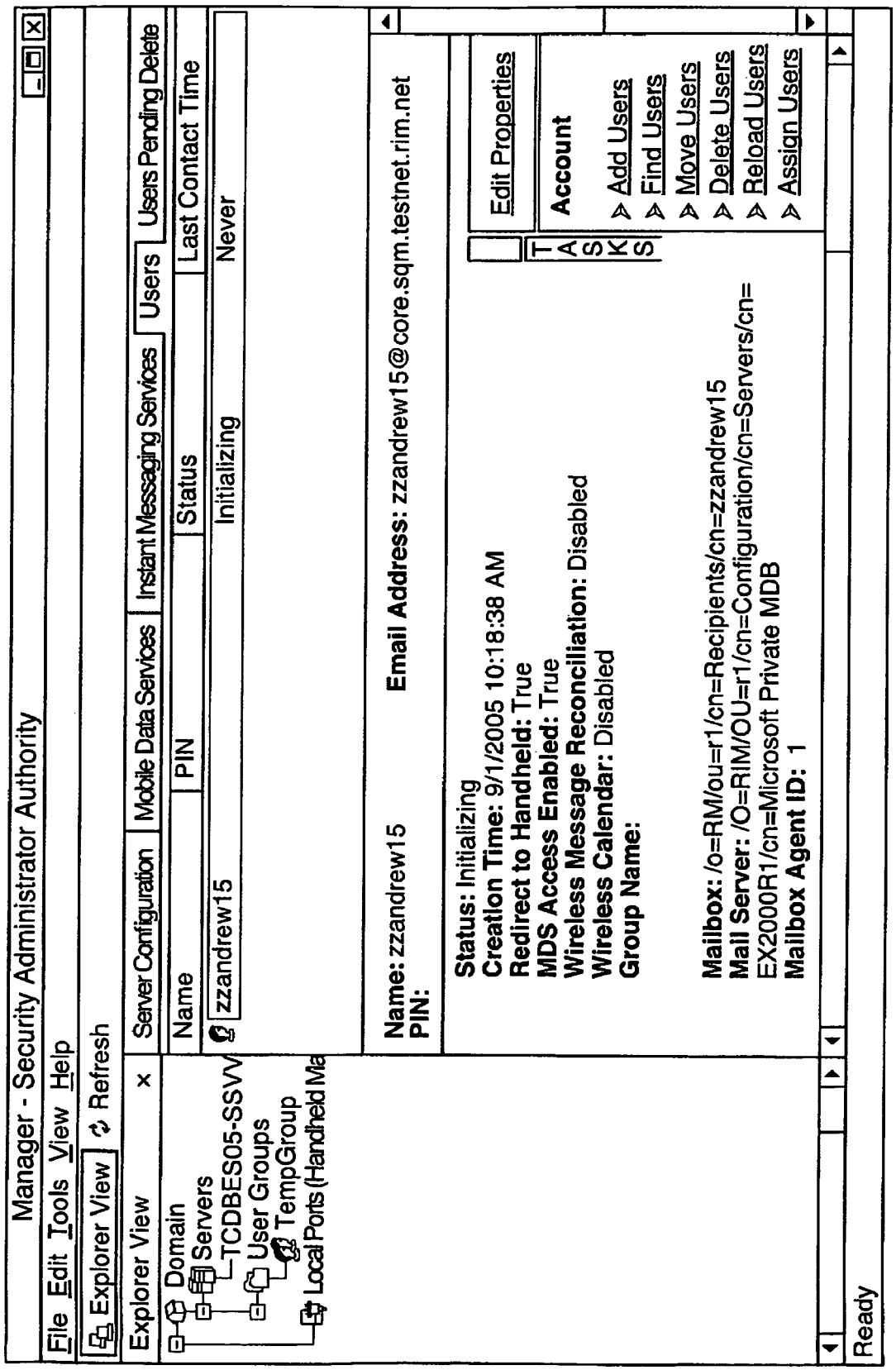
FIG. 5A is the representation of FIG. 4B with a user selected for deletion.
Figure 5B:
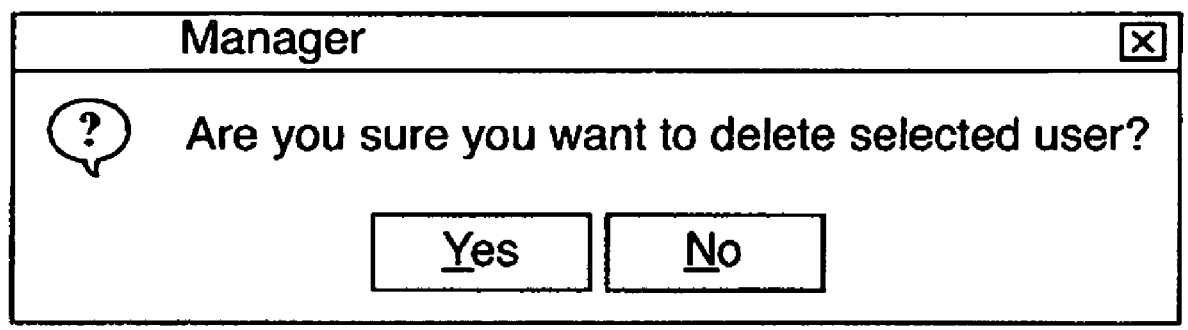
FIG. 5B shows a prompt for deleting the selected user.
Figure 5C:
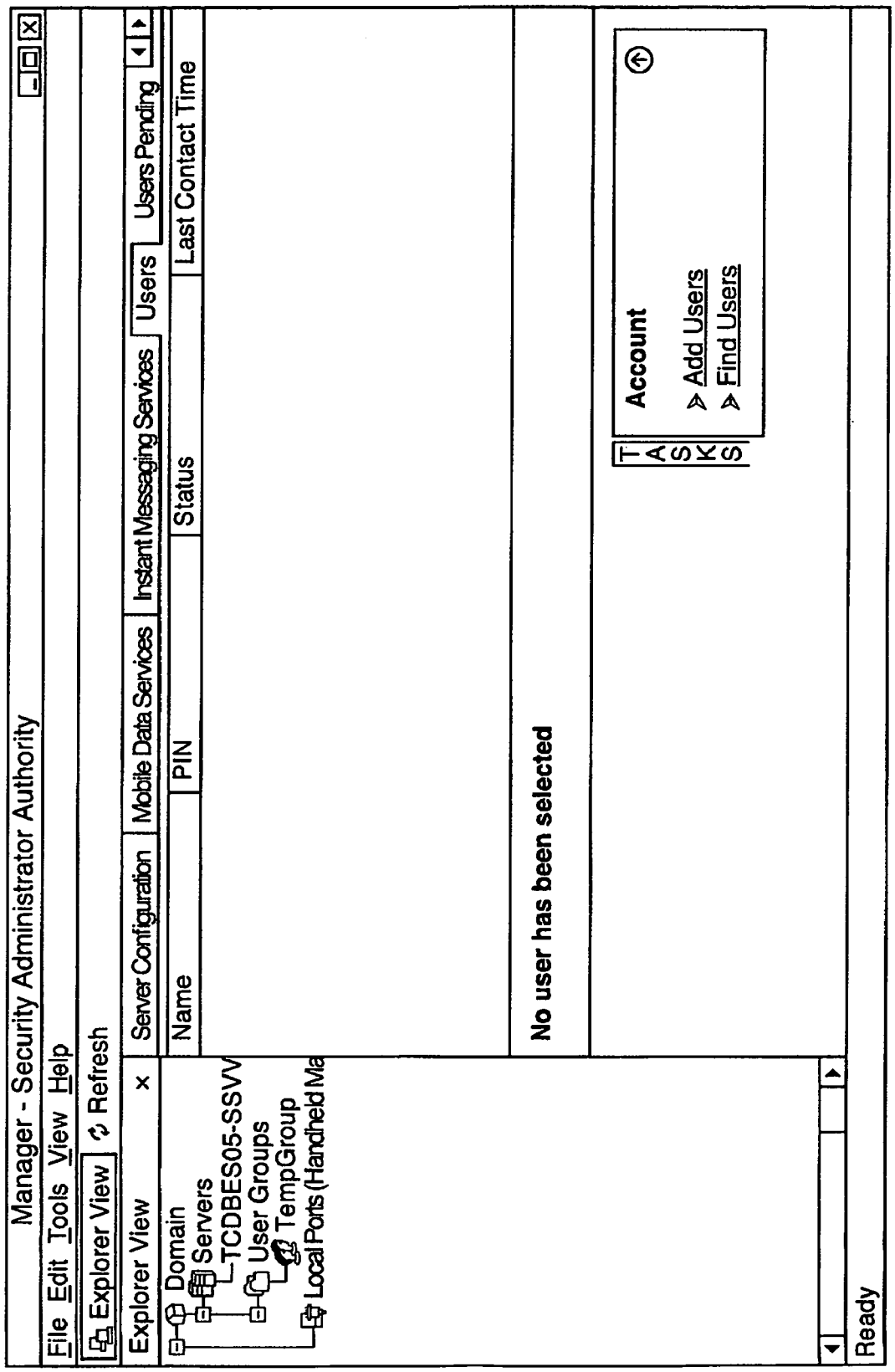
FIG. 5C is the representation of FIG. 4D with the selected user deleted.

According to the user interface of FIG. 5A, a user (zzandrew15) is shown as having been added by the script. In response to the script selecting the user and activating the "Delete User" link, a prompt is displayed to delete the user (FIG. 5B). The script then pushes the "Yes" button, the user is deleted, and the script searches the list of users to ensure the user no longer appears in the list (FIG. 5C).

Figure 3A:
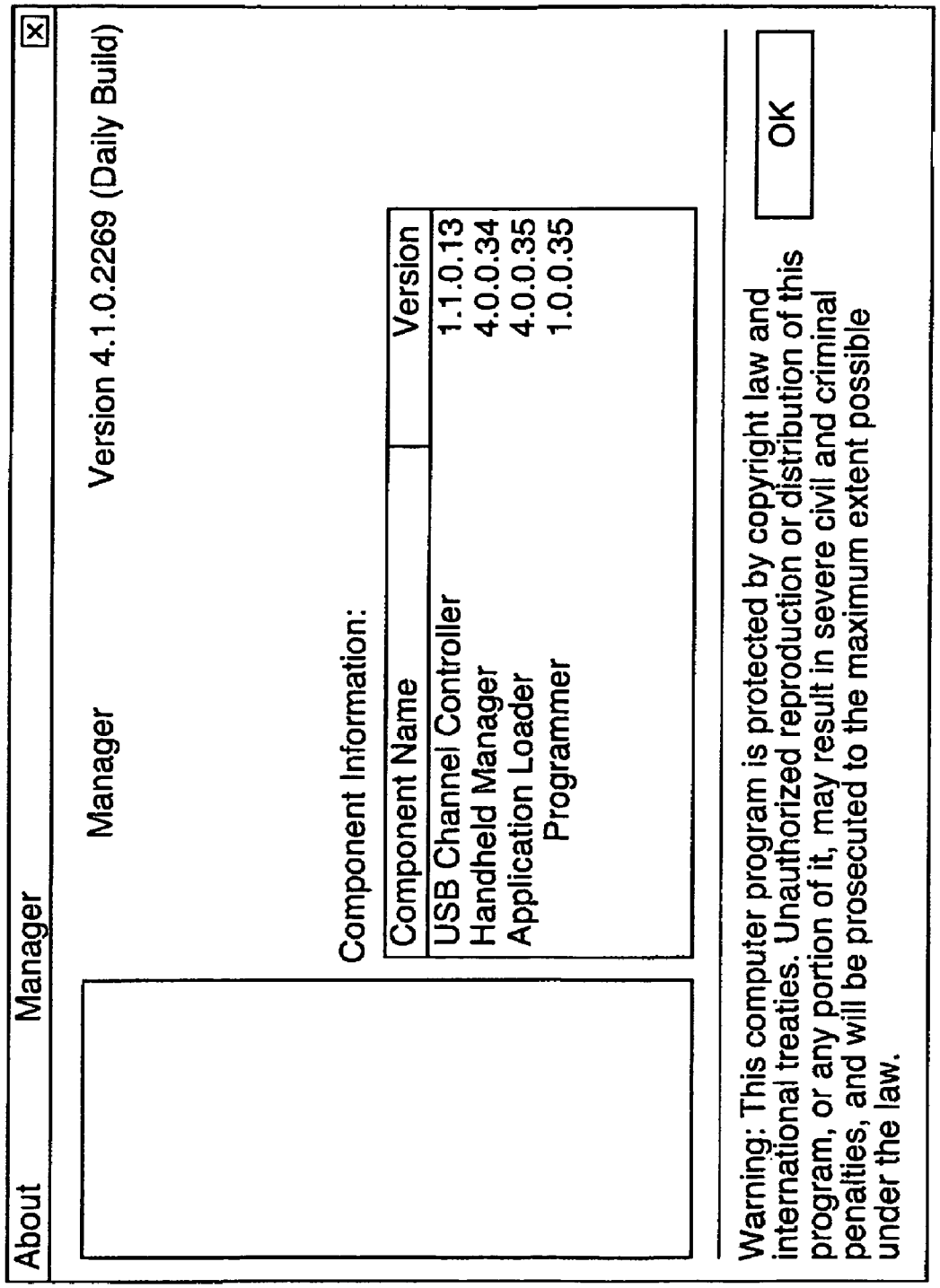
FIG. 3A is a representation of a user interface window from which version numbers of various components are collected by the script, according to the preferred embodiment.

The "verifyVersion" module compares data displayed by the user interface window of FIG. 3A relating to components, to component versions either entered by the user or automatically populated by the "GetFileVersion" module. The variables populated previously are compared to the version numbers displayed in "About Manager." Object data is retrieved from the window and version numbers listed are compared against variables. The script ensures that the component versions retrieved from the components themselves via "GetFileVersion" match up with those displayed in this window.

Execution of the "verifyWindowContent" module may include a module for each of several HTML frames displayed by the user interface generated by the administration software. Such frames include: "Server Configuration," "User List," "Global," "Server List," "Mobile Data Service," "Ports," "Handhelds," and "Configurations." These modules ensure that all of the correct data is displayed in the HTML documents included within these frames. As discussed above, the Document Object Model (DOM) of United States Patent Publication Number 20050108636 may be used to access the data and parse it to verify that the correct data is being displayed.

FIG. 5A shows two examples of embedded HTML documents. The HTML document is the area with the task links such as "Add User" and "Delete User." A hotkey combination is used to copy the HTML source code of the current document in display to the clipboard. This content is then written from the clipboard to a browser object via the COM interface. The Document Object Model (DOM) is then used to parse the HTML source code to verify its contents. It will be appreciated that HTML source content may be verified by any of a number of other techniques. For example, a single browser object could be re-used throughout the application each time a tab is selected and an HTML document is displayed. This would allow Built-in Rational Robot/SQABasic utilities to recognize each document that is displayed, and would remove the requirement to retrieve and parse HTML source in the manner described above.

The "checkSQLDB" module checks configuration database 3 using SQL for each operation performed by the administration software that causes a change in this database to ensure that proper changes are made in response to such operations. For example, after adding a user, as discussed above, it is expected that specific database fields will be updated with values that reflect the added user. For example, it would be expected that a row be added in the configuration database in the "UserConfig" table for a newly added user (see FIG. 6). This table may be queried via SQL using the function "ExecuteODBCQueryRetrieve" found at: http://safsdev.sourceforge.net/sqabasic2000/DatabaseUtilities.htm The results of the query would be compared against the expected values for that user. Thus, as shown in FIG. 6, it would be expected that a new row be created after "AddUsers" adds the user with name "zzandrew15".

The "checkLog" module accesses the server logs after operations performed by the administration software that cause interaction with the servers 1A, 1B and 1C. When a specific operation is performed, this module parses the log files to ensure that proper entries are added. For example, with reference again to the "AddUsers" scenario described above involving the SQL query, it would be expected that specific log entries appear in the logs of servers 1A, 1B, 1C, etc. These logs may be read via built-in file I/O utilities in the SQABasic language.

An example of the expected log entries when adding user "zzandrew15" is:

(09/01 00:05:59):{0x610} {zzandrew15@core.sqm.testnet.rim.com} Still handled by desktop (09/01 00:05:59):{0x610} {zzandrew15@core.sqm.testnet.rim.com} GetDeviceId( ) failed (09/01 00:05:59):{0x610} {zzandrew15@core.sqm.testnet.rim.com}—HandleDatabaseChange—Failed to read Cal Sync State use previous value=0
(09/01 00:05:59):{0x610} User settings: email=zzandrew15§core.sqm.testnet.rim.com, routing=zzandrew15@core.sqm.testnet.rim.com, service=, device=, calendar=0, MDS=1, userOTAFM=0, incradle=0, SMIME=0, sentitems=0, dir=zzandrew15, server=EX2000R1.

Returning to FIG. 2, the script begins (step 21) by logging in to the server 1A, 1B or 1C (a password for the server.id file will be required to be input by the tester when the server is selected).

At step 23, the script clicks on the "Server Configuration" pane and calls the "verifyWindowContent" module to ensure that the correct window is displayed.

Next, at step 25, the script adds users (one-at-a-time, by calling the "RoboManager.rec" script for selecting the "Add Users" link on the user interface (FIG. 3B)). The "verifyWindowContent" module is then called again to ensure that each user appears in the User list, and the "checkSQLDB" and "checkLog" modules are called to ensure that the users have been added.

Then, at step 27, the script deletes the users (one-at-a-time, by calling the "deleteUsers" module for selecting the "Delete Users" link on the user interface (FIG. 3B)). The "verifyWindowContent" module is then called again to ensure that each user no longer appears in the User list, and the "checkSQLDB" and "checkLog" modules are called to ensure that the users have been removed.

Next, at step 29 the script adds multiple users simultaneously (by invoking the "RoboManager.rec" script to click on each name from the name and address book (NAB)). Alternatively, a list of users may be provided in a text file. The "verifyWindowContent" module is then called again to ensure that each user appears in the user list, and the "checkSQLDB" and "checkLog" modules are called to ensure that the users have been added.

Then, at step 31, the script deletes the users simultaneously (by calling the "deleteUsers" function for selecting each user and pressing the "Delete Users" link from the "User List" tab on the user interface (FIG. 5A)). The "verifyWindowContent" module is then called again to ensure that each user no longer appears in the user list, and the "checkSQLDB" and "checkLog" modules are called to ensure that the users have been removed.

Next, at step 33, the script calls the "RoboManagerrec" script for adding all users on the NAB simultaneously to the server 1A. The "verifyWindowContent" module is then called again to ensure that each user appears in the User list (FIG. 3B), and the "checkSQLDB" and "checkLog" modules are called to ensure that the users have been added.

At step 35, the script clicks the top user on the user list. The "verifyWindowContent" module is then called to ensure a screen is displayed with correct information.

At step 37, the script clicks on the "Other Tasks" button in the "User List" view to display a list of tasks (FIG. 5A shows the interface with tasks).

Figure 7A:
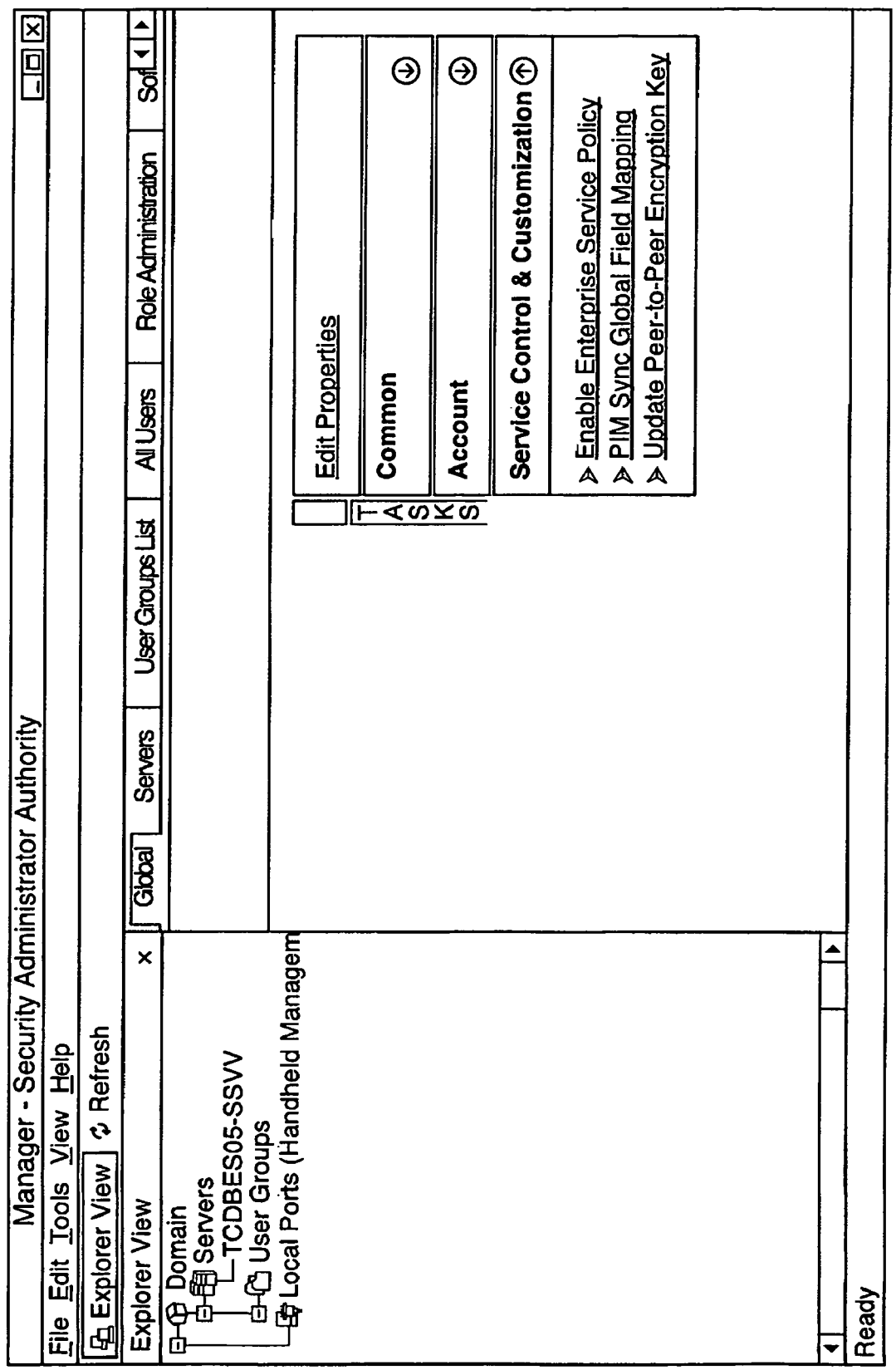
FIG. 7A is a representation of a user interface window showing a PIM Synch Global Field Mapping function.

The script clicks on the "PIM Synch Field Mapping" link at step 39 to display a list of mappings. The "verifyWindowContent" module is then called to ensure that a "PIM Synch Field Mapping" dialogue box is displayed. FIG. 7A shows a pane with the PIM Synch Global Field Mapping function, and FIG. 7B shows the dialogue displayed after clicking on the task link.

Figure 8A:
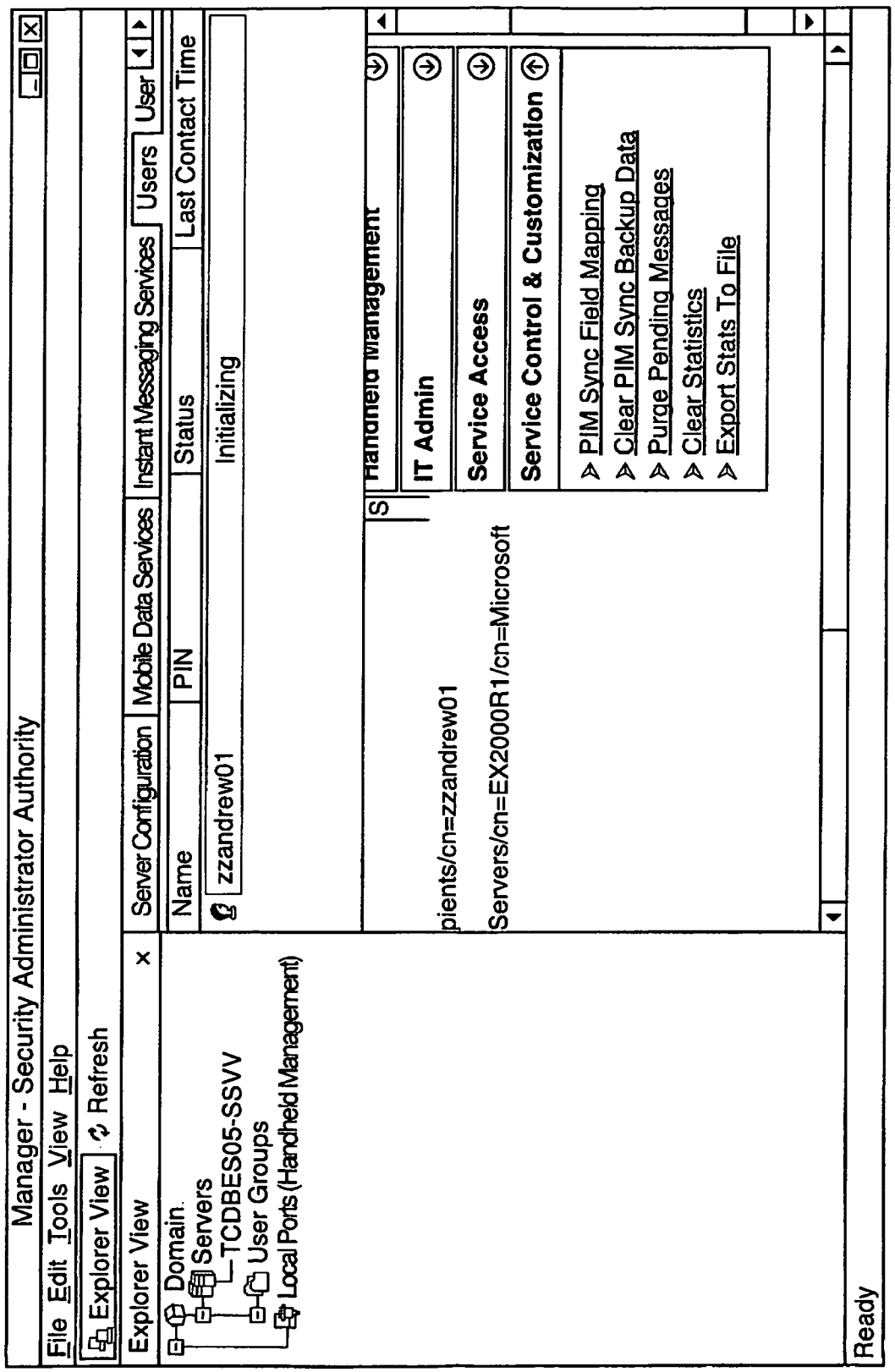
FIG. 8A shows a frame with the task "Export Stats To File".
Figure 8B:
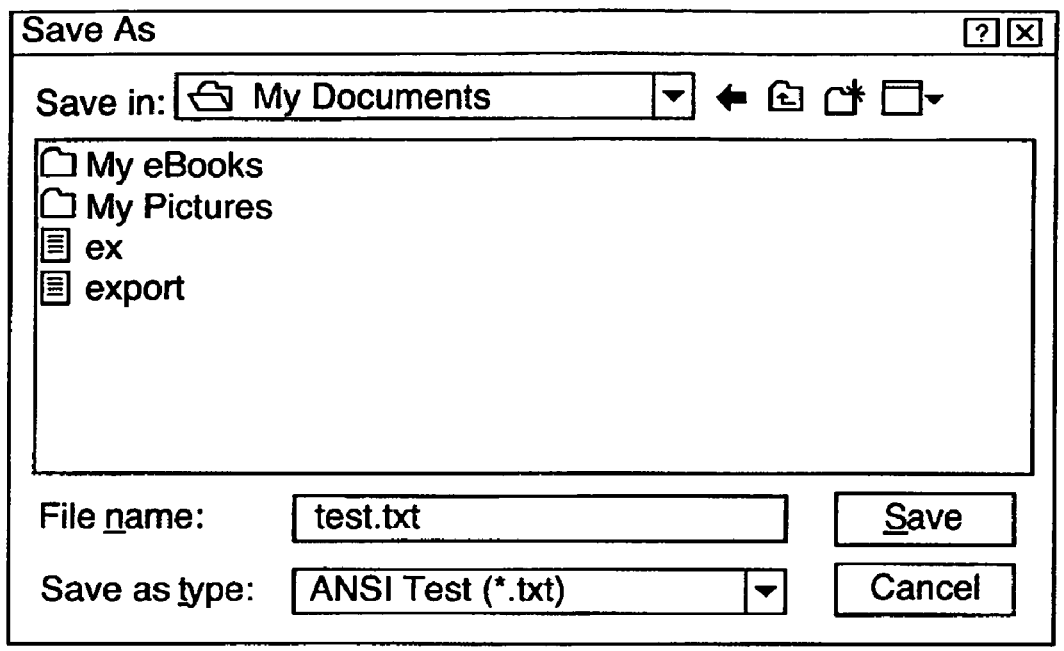
FIG. 8B shows a user interface dialogue to export user stats to the file after clicking the "Export Stats To File" link of FIG. 8A.
Figure 8C:
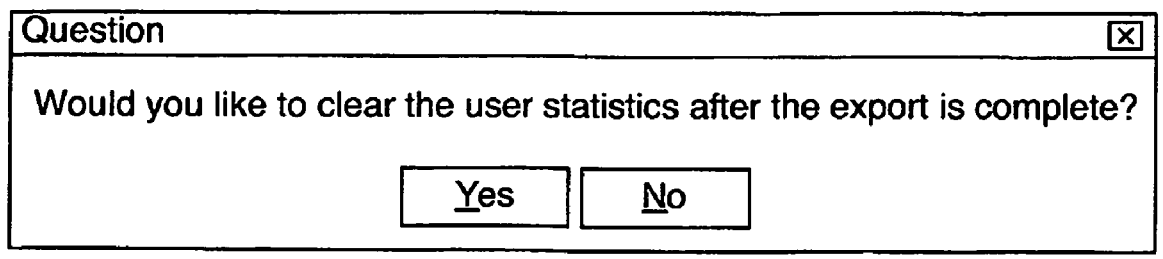
FIG. 8C shows a prompt displayed to clear statistics after the export link is clicked in FIG. 8B.

At step 41, the script clicks on an "Export Stats To File" link to export a file (e.g. "test.txt") and ensures that the file is properly exported and does exist. FIG. 8A shows a frame with the task "Export Stats To File". FIG. 8B shows a dialogue to export user stats to the file after clicking the "Export Stats To File" link, and a prompt is displayed (FIG. 8C) to clear statistics after the export (by clicking "Yes" the stats are cleared, by clicking "No" the stats are not cleared). The script ensures that the window is displayed, and then uses built-in SQABasic utilities to search for the file in the location specified.

Figure 9A:
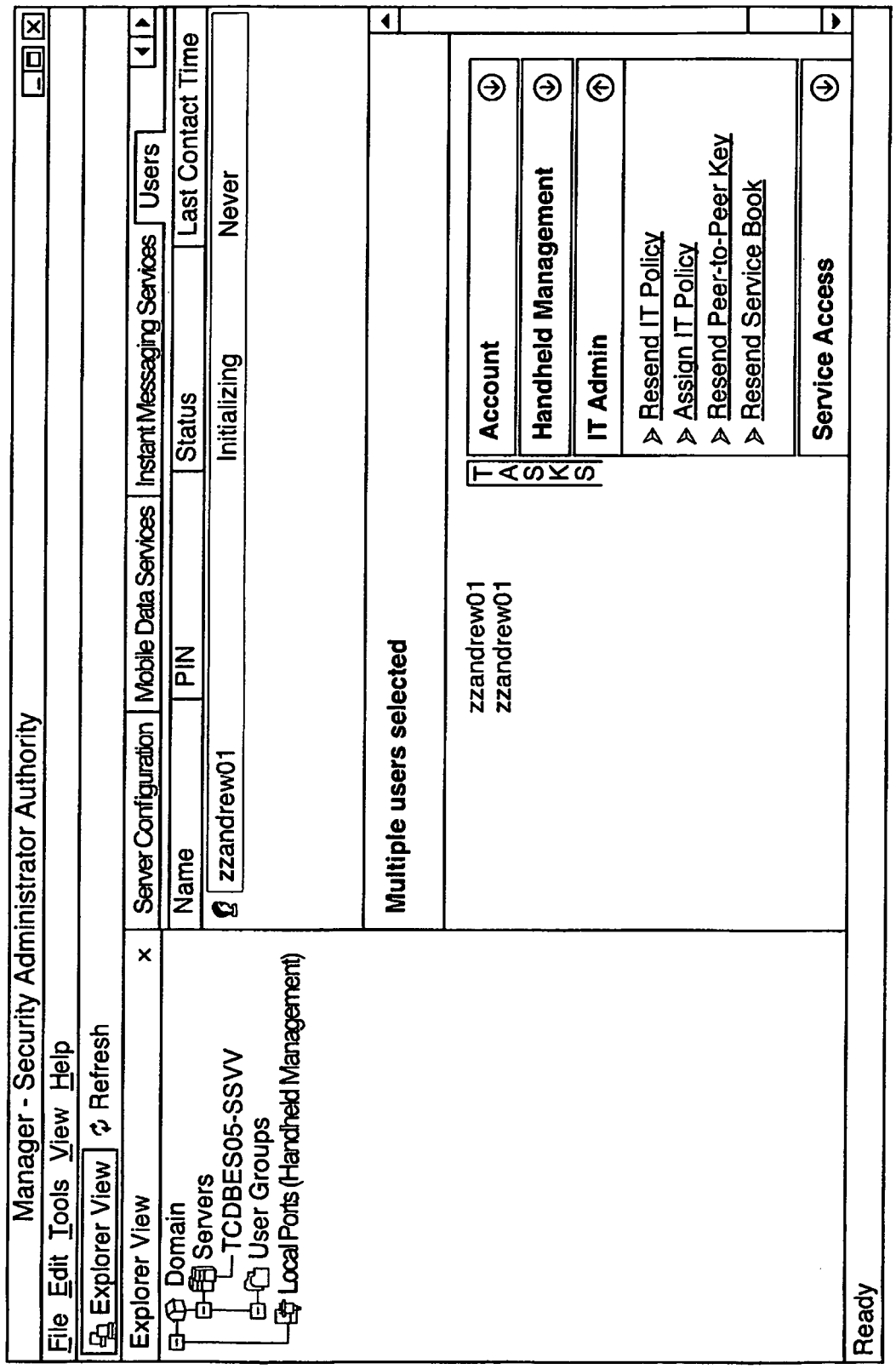
FIG. 9A shows a frame with an IT Admin Tasks button to display a list of tasks.

Next, at step 43, the script clicks on the "IT Admin Tasks" button to display a list of tasks. The "verifyWindowContent" module is called to ensure that the proper window is displayed (see FIG. 9A).

Figure 9B:
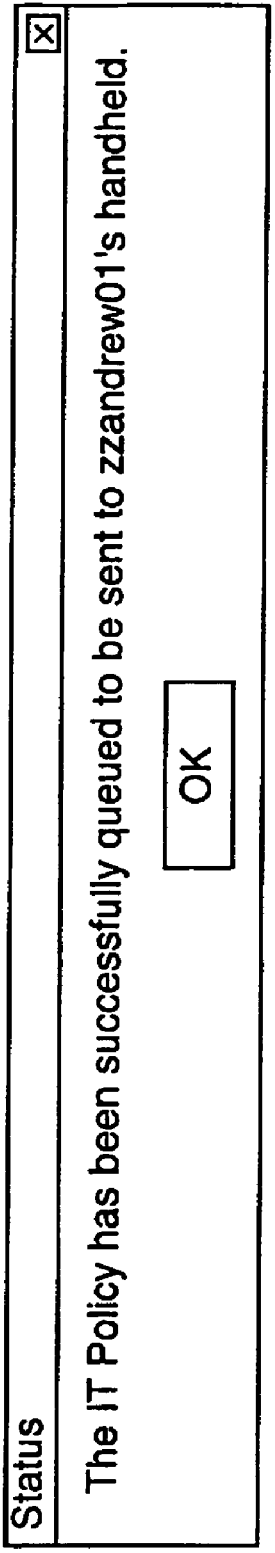
FIG. 9B shows a prompt displayed after clicking a "Resend IT Policy" link in the interface of FIG. 9A.

At step 45, the script clicks on the "Resend IT Policy" link and the "verifyWindowContent" module is again called to ensure that a prompt is displayed indicating the IT Policy has been successfully queued to be sent to the user's handheld device 19. FIG. 9B shows a prompt displayed after clicking "Resend IT Policy" with "zzandrew01" selected.

Figure 9C:
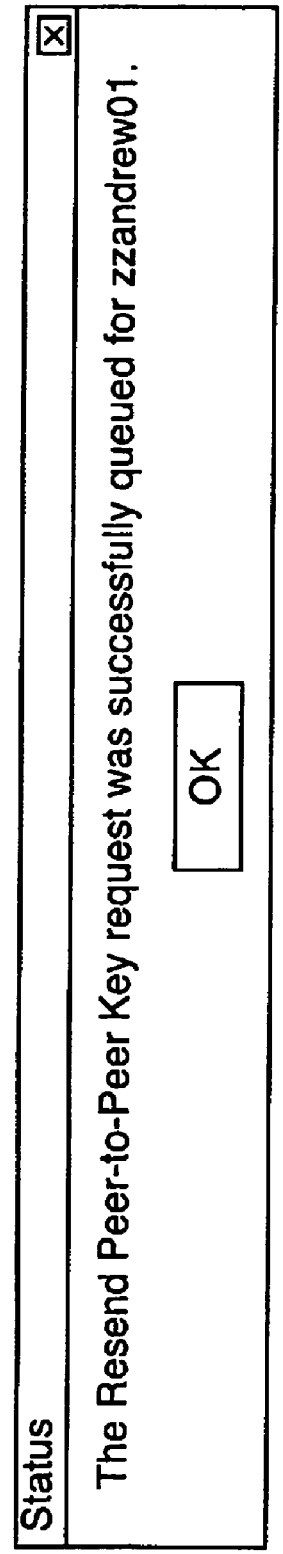
FIG. 9C shows a prompt displayed after clicking "Resend Peer-to-Peer Key" in the interface of FIG. 9A.

At step 47, the script clicks on the "Resend Peer-to-Peer Key" link and the "verifyWindowContent" module is again called to ensure that an error message is displayed indicating that a key must be set for the user to resend it. FIG. 9C shows a prompt displayed after clicking "Resend Peer-to-Peer Key" with "zzandrew01" selected.

Figure 9D:
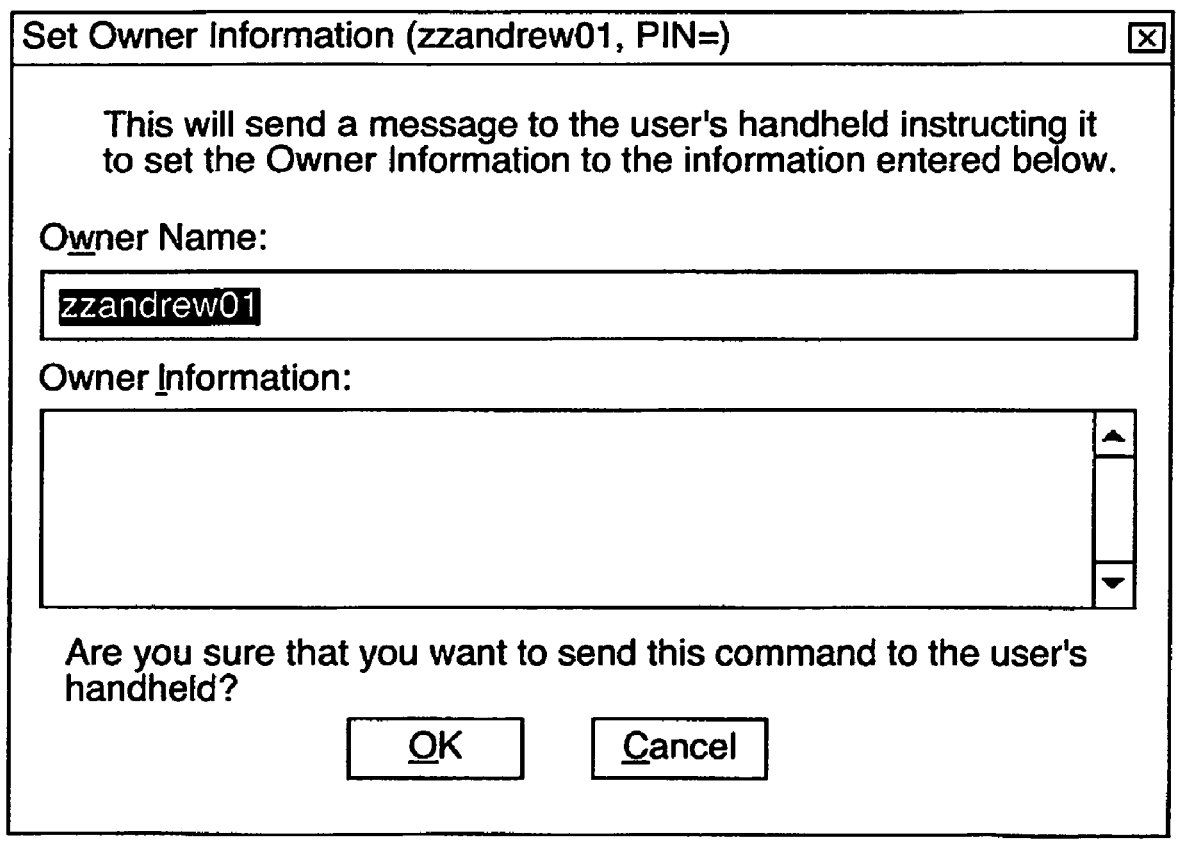
FIG. 9D shows a prompt displayed after clicking "Set Owner Information" in the interface of FIG. 9A.
Figure 9E:
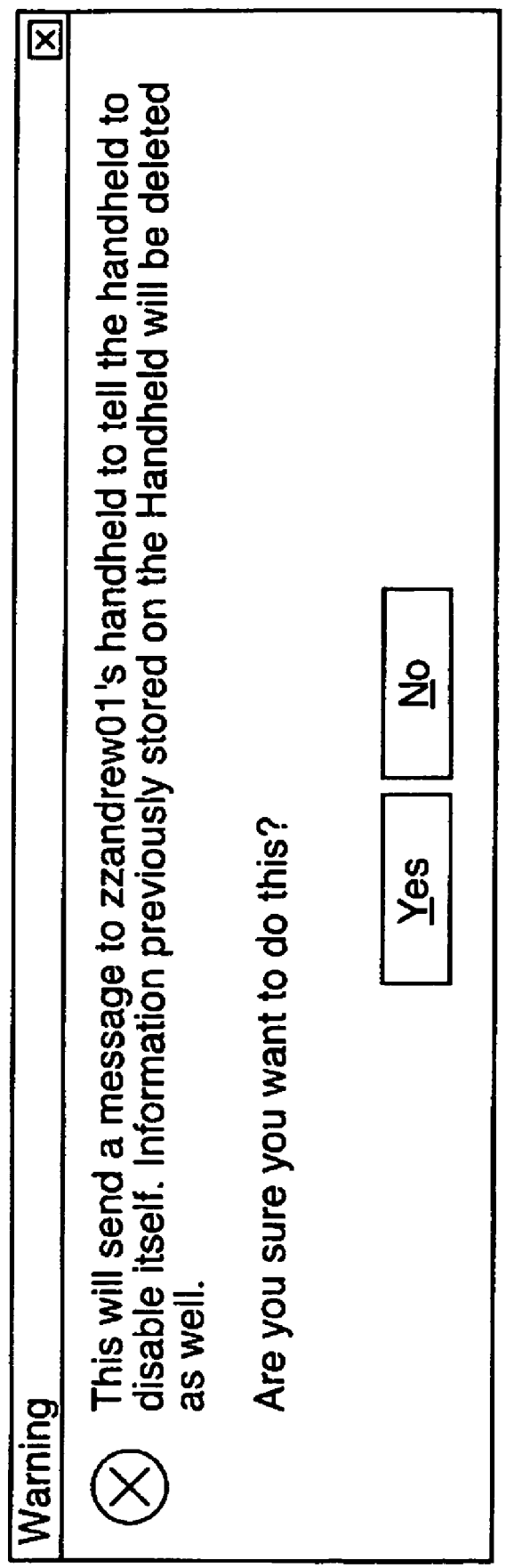
FIG. 9E shows a prompt displayed after clicking "Erase Data and Disable Handheld" in the interface of FIG. 9A.

At step 49, the script clicks on the "Set Owner Information" link and the "verifyWindowContent" module is again called to ensure that a dialogue box is displayed that allows owner information to be entered for the user and that a further dialogue box is displayed to indicate that the request has been successfully queued to be sent to the user's handheld device 19. FIG. 9D shows a prompt displayed after clicking "Set Owner Information" with "zzandrew01" selected.

At step 51, the script clicks on the "Erase Data and Disable Handheld" link and the "verifyWindowContent" module is again called to ensure that a dialogue box is displayed asking the user to confirm the action (the script then selects "No"). FIG. 5E shows a prompt displayed after clicking "Erase Data and Disable Handheld" with "zzandrew01" selected.

Figure 10:
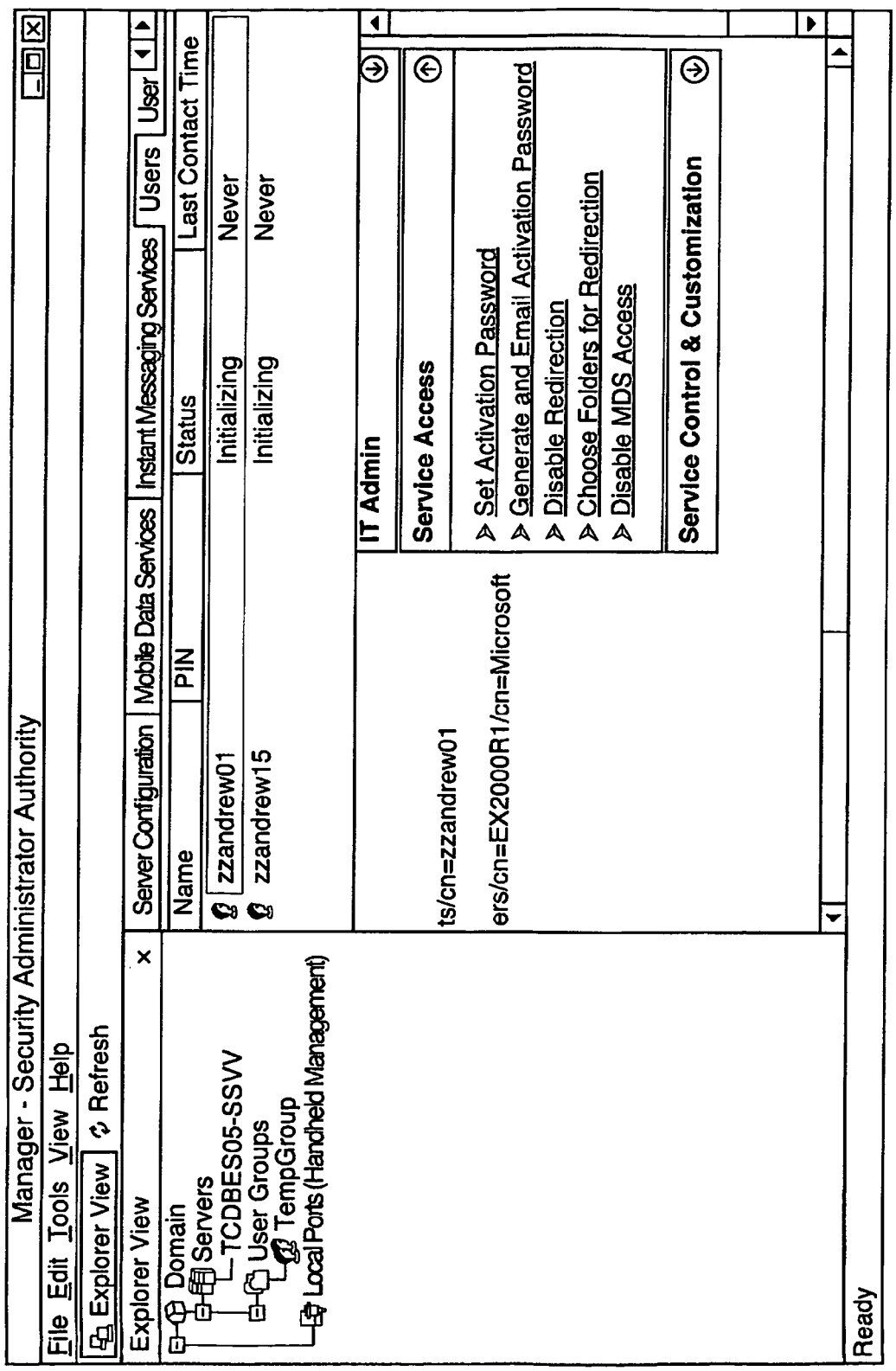
FIG. 10 shows a "Set Activation Password" link within a "Service Access" category of the user interface.

Then, at step 53, the script clicks on the "General Tasks" button to display a list of tasks followed and then clicks on the "Set Activation Password" link at step 55. The "verifyWindowContent" module is again called to ensure that a password can be entered in twice to confirm it. The script also confirms that in the dropdown box for "Password expires in," scrolling up to the top of the list is permitted, in order to view all of the entries and that "24 hours" can be selected. FIG. 10 shows the "Set Activation Password" link, under "Service Access".

Figure 11A:
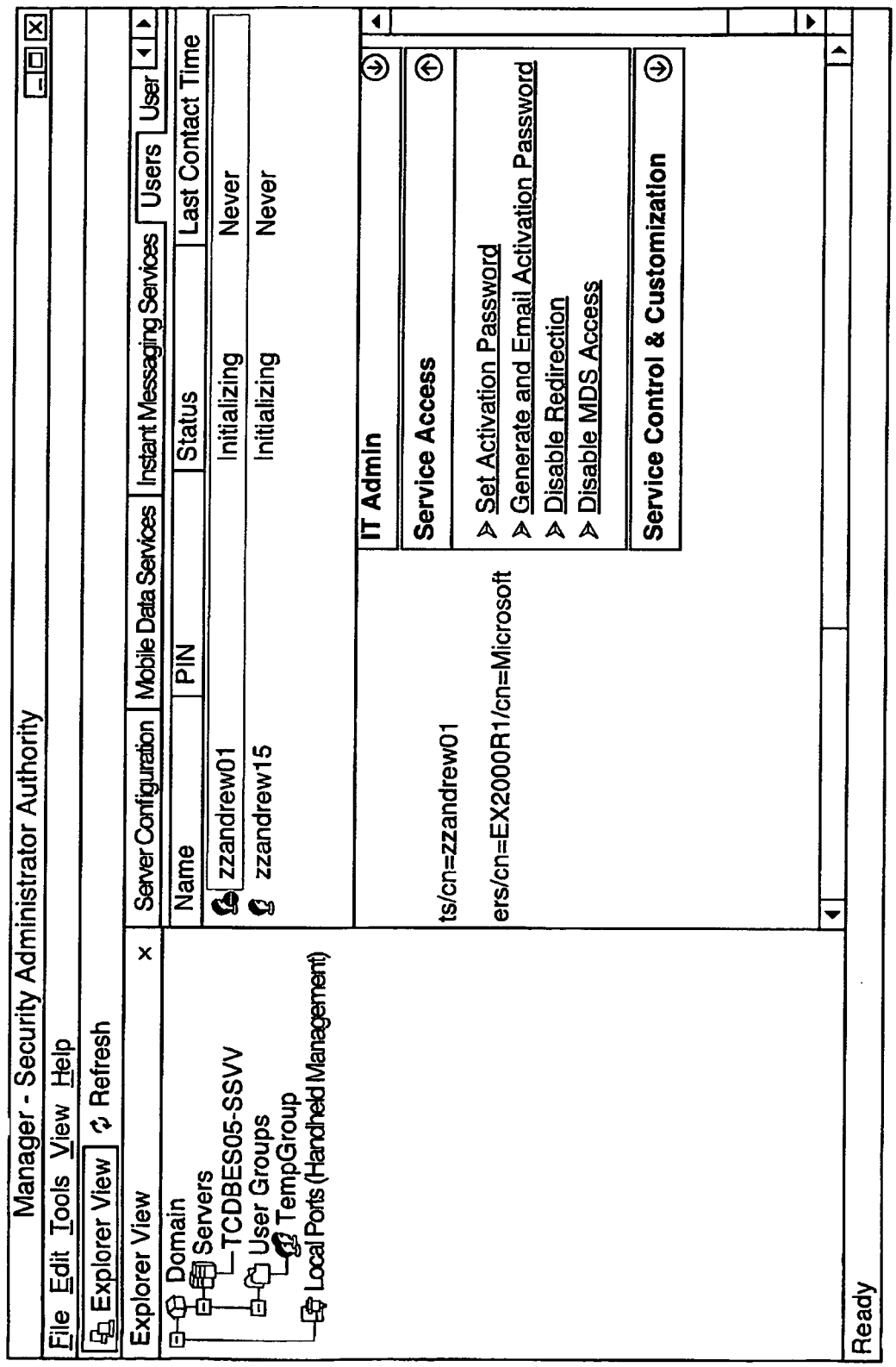
FIG. 11A shows a red symbol displayed beside a user name resulting from the script clicking a "Disable Redirection" link in the user interface.
Figure 11B:
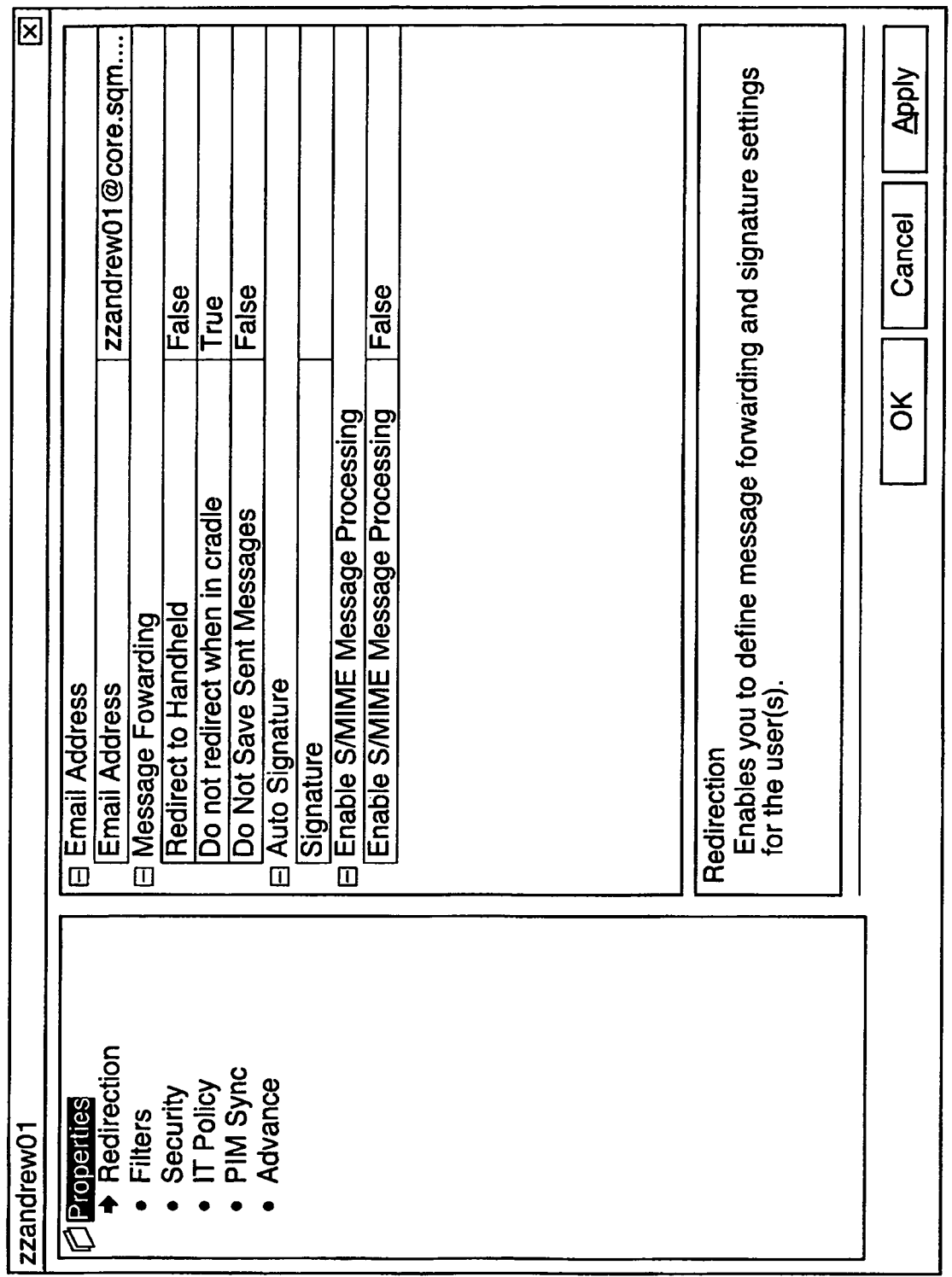
FIG. 11B shows the user's property page with the "Redirect to handheld" property set to "False".

At step 57, the script clicks on the "Disable Redirection" link and the "verifyWindowContent" module is again called to ensure that a small red sign is displayed next to the user icon and that "Redirect to handheld" is set to "False" in the User properties data box and that the "Disabled Redirection" link becomes "Enable Redirection". FIG. 11A shows user "zzandrew01" with a red symbol next to the user name, which appears after the script has clicked "Disable Redirection" with the user selected. FIG. 11B shows the user's property page with the "Redirect to handheld" property set to "False".

Figure 12A:
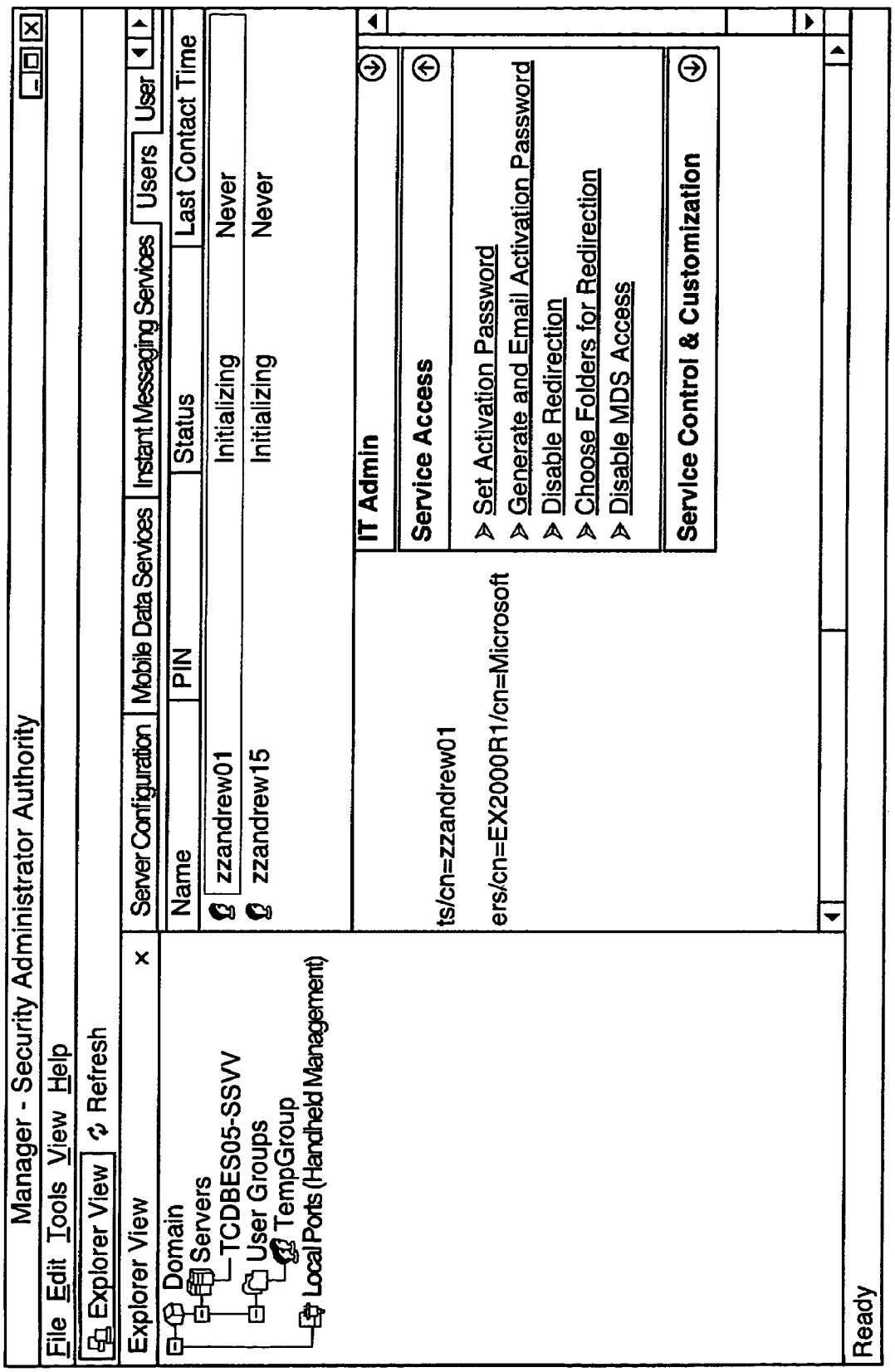
FIGS. 12A and 12B show the user interface displays after "Enable Redirection" is clicked.
Figure 12B:
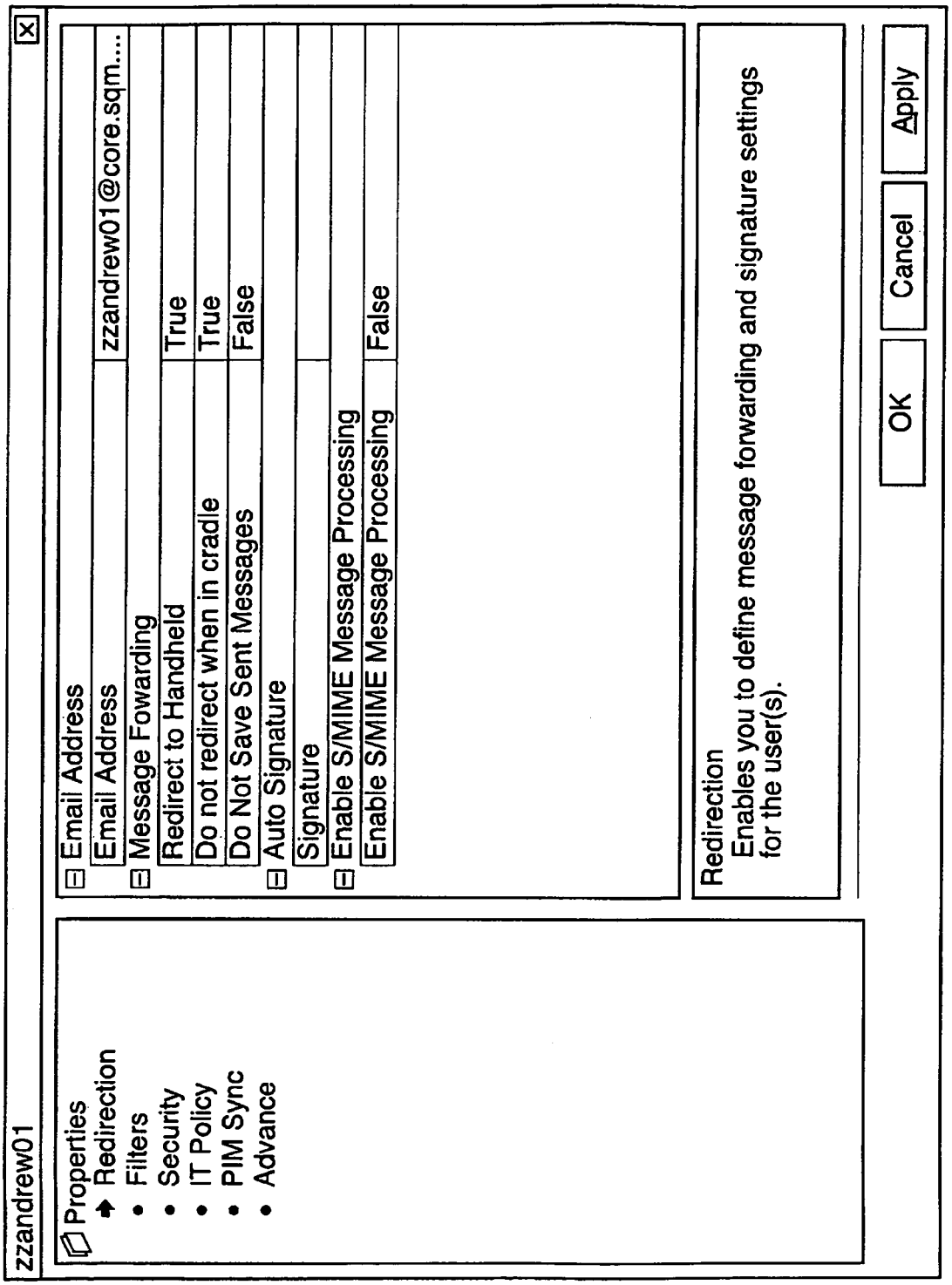

At step 59, the script clicks on the "Enable Redirection" link and the "verifyWindowContent" module is called to ensure that the small red sign next to the User icon is removed and that "Redirect to handheld" is set to "True" in the User properties data box. FIGS. 12A and 12B show the user interface displays after "Enable Redirection" is clicked.

Figure 13A:
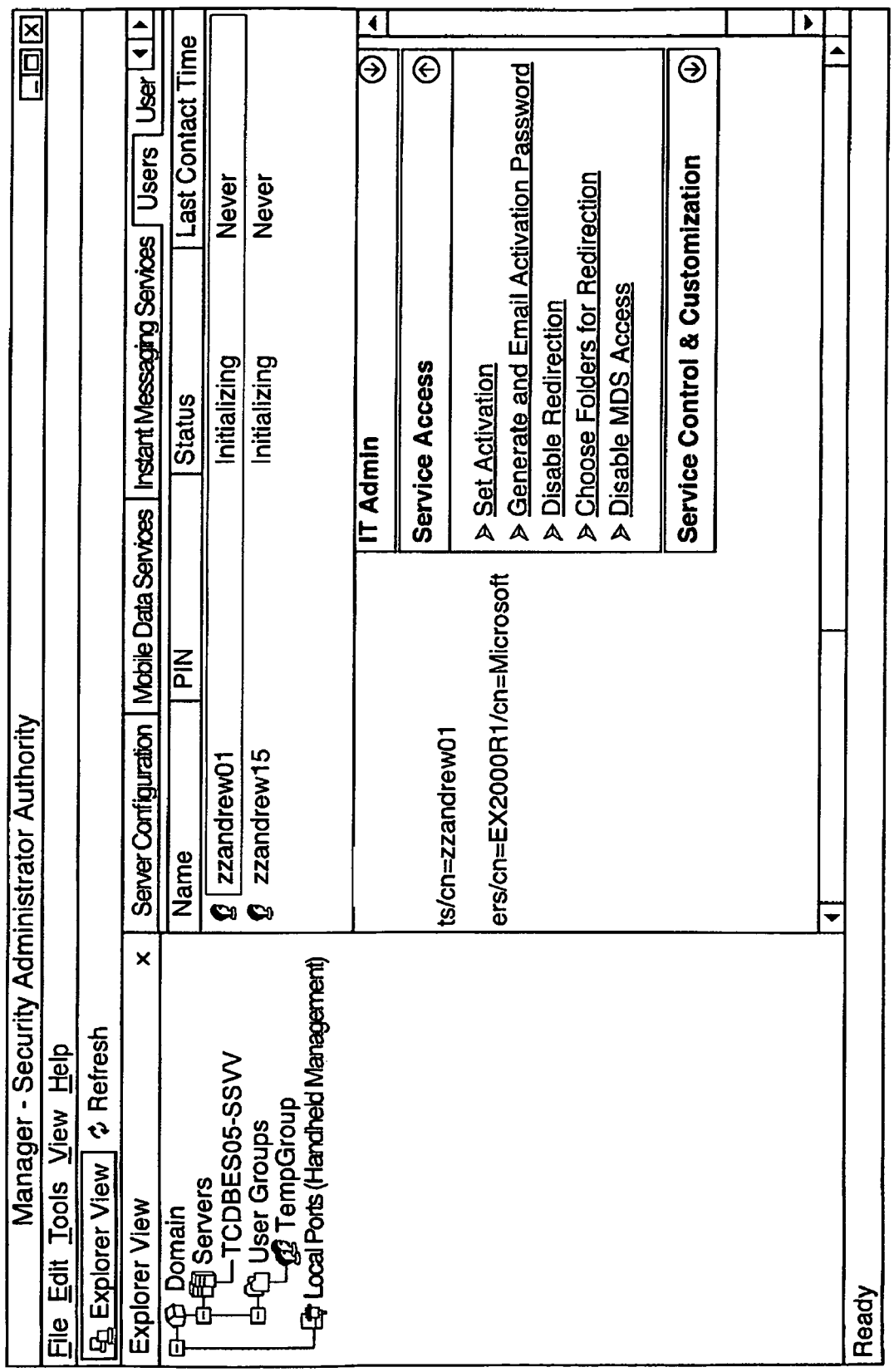
FIG. 13A shows a link for changing "Enable MDS Access" and FIG. 13B shows the "MDS Access Enabled" field for the user set to "False".
Figure 13B:
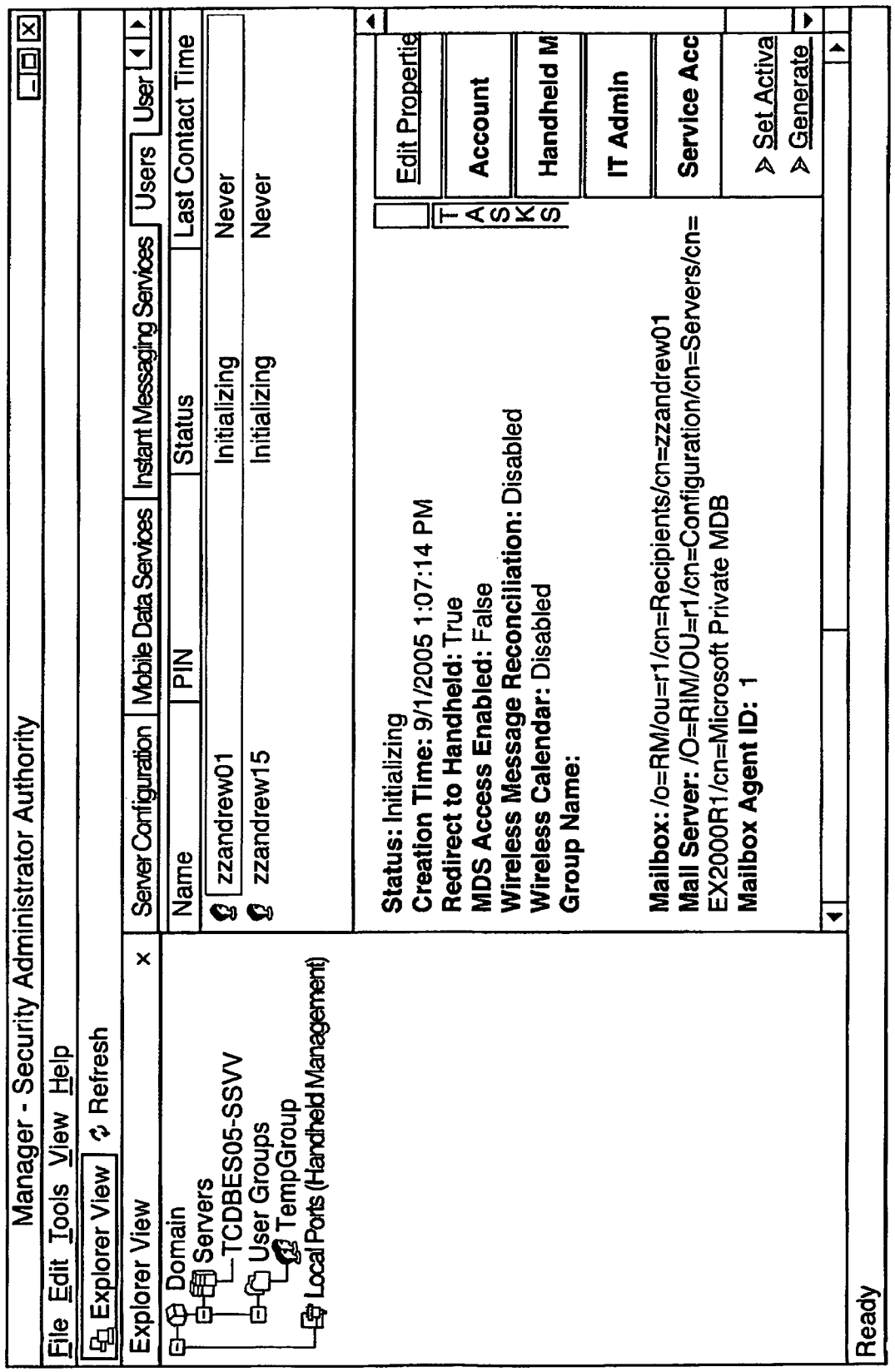

At step 61, the script clicks on the "Disable MDS Access" link and the "verifyWindowContent" module is called to ensure that "Mobile Data Service Enabled" is set to "True" and that the "Enable MDS Access" link becomes "Disable MDS Access". FIG. 13A shows the link for changing "Enable MDS Access" and FIG. 13B shows the "MDS Access Enabled" field for the user set to "False".

Figure 14A:
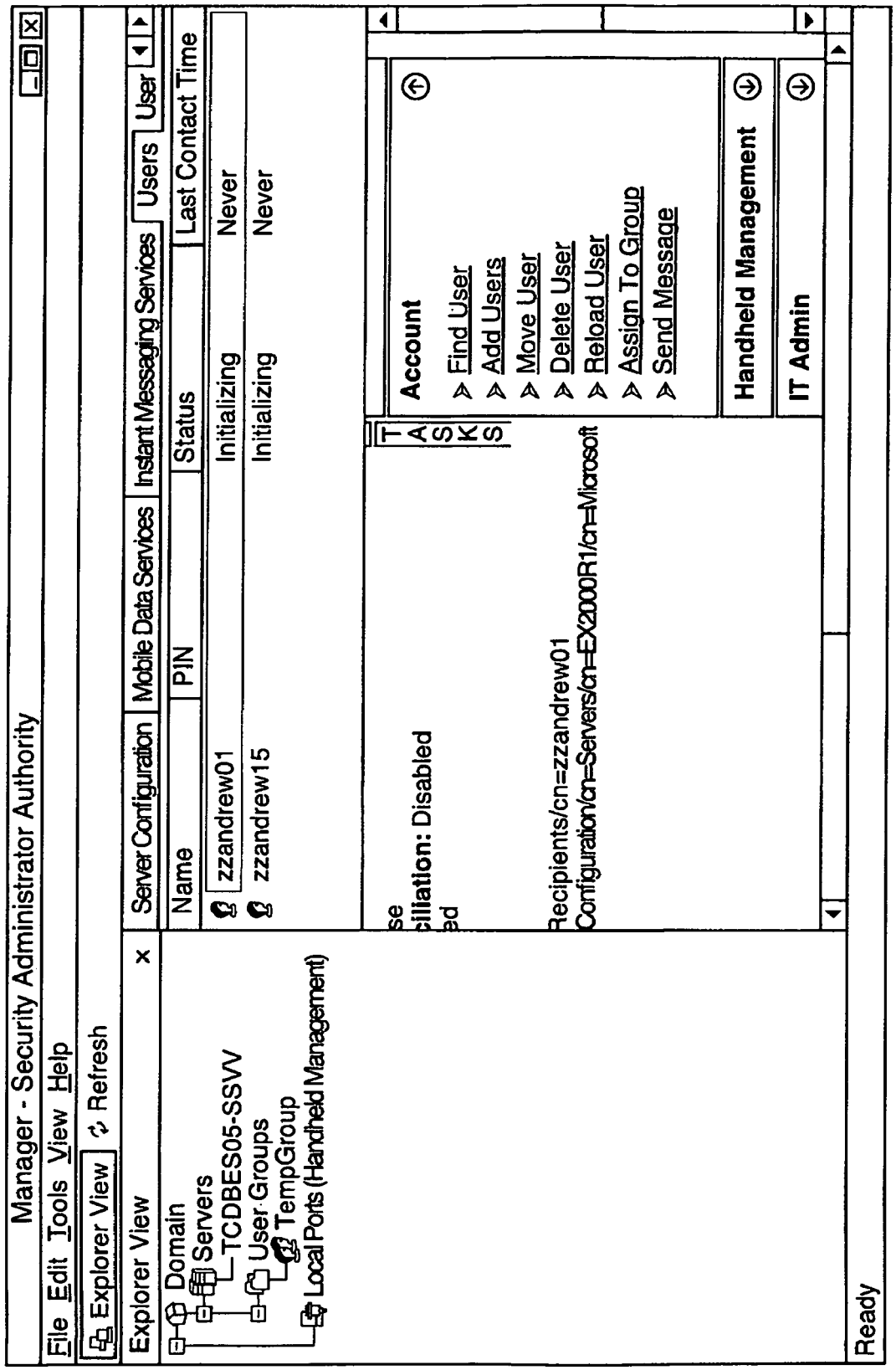
FIG. 14A shows a "Move User" task link.
Figure 14B:
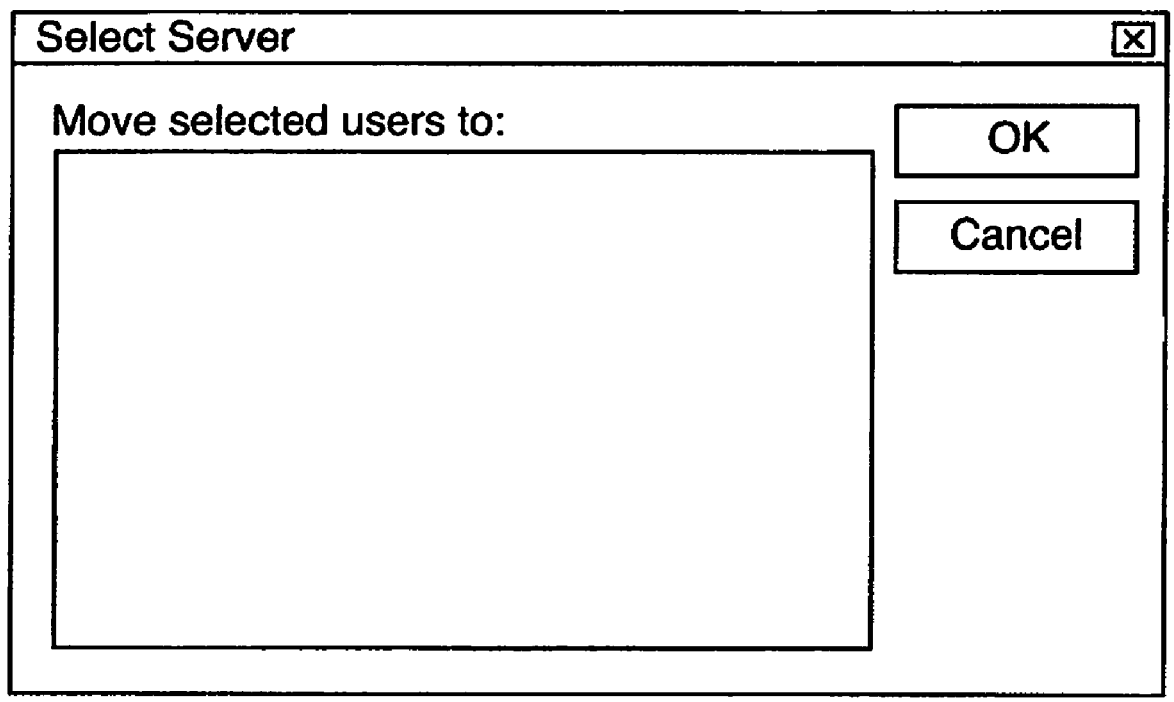
FIG. 14B shows an empty dialog box displayed after the script clicks at the "Move User" link.

At step 63, the script clicks on the "Move User" link and the "verifyWindowContent" module is called to ensure that a "Select Server" dialogue box is displayed, which is empty (in response, the script clicks "Cancel"). FIG. 14A shows the "Move Use" task link and FIG. 14B shows the "Select Server" dialogue box. It should be noted that if other servers (1B, 1C, etc) are connected to the database 3, then they will also be listed in the dialogue box.

Figure 15A:
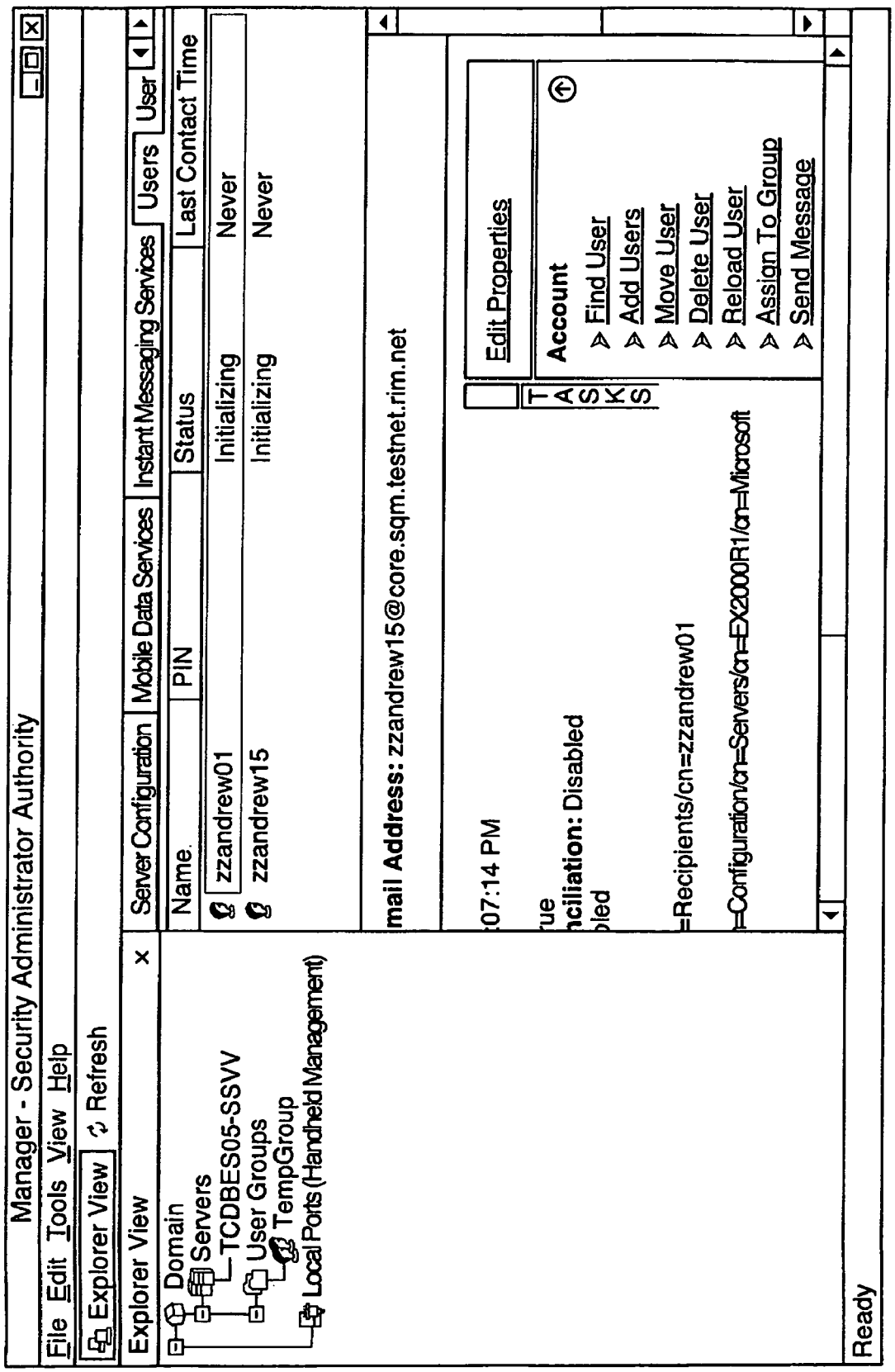
FIG. 15A shows an "Edit Properties" task link.

At step 65, the script clicks on the "Edit Properties" link and the "verifyWindowContent" module is called to ensure that a "User Properties" dialogue box is displayed that contains a number of links to windows in the left "explorer" pane. The automated script clicks on each link and ensure that the proper window is displayed for each. FIG. 15A shows the "Edit Properties" task link, and FIG. 15B shows the property page for the user displayed after clicking the link.

Figure 16A:
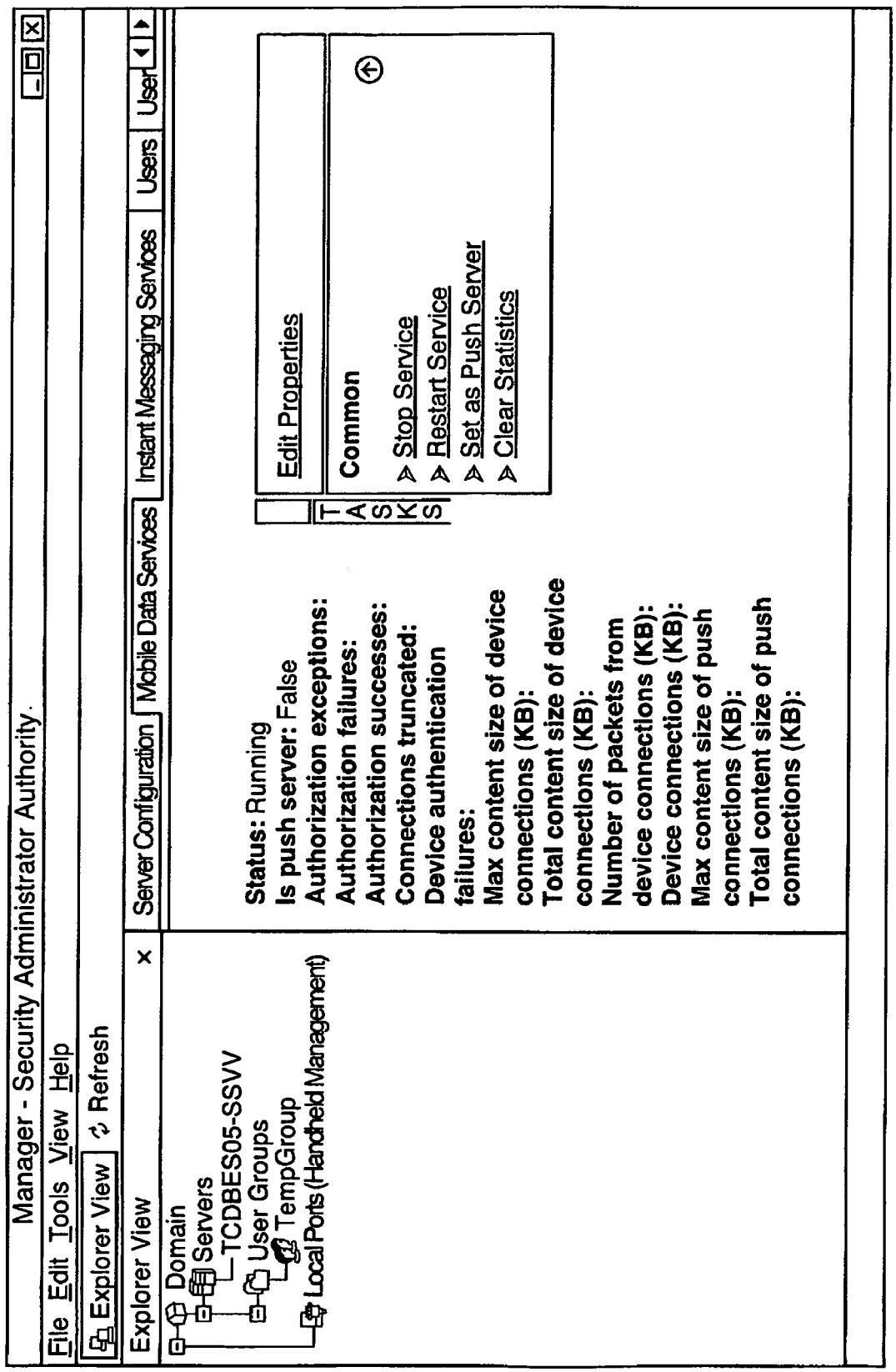
FIG. 16A shows a "Mobile Data Services" tab on the user interface.

At step 67, the script clicks on the "Mobile Data Services" tab and the "verifyWindowContent" module is called to ensure that the proper window is displayed for this tab. FIG. 16A shows the "Mobile Data Services" tab.

Figure 16B:
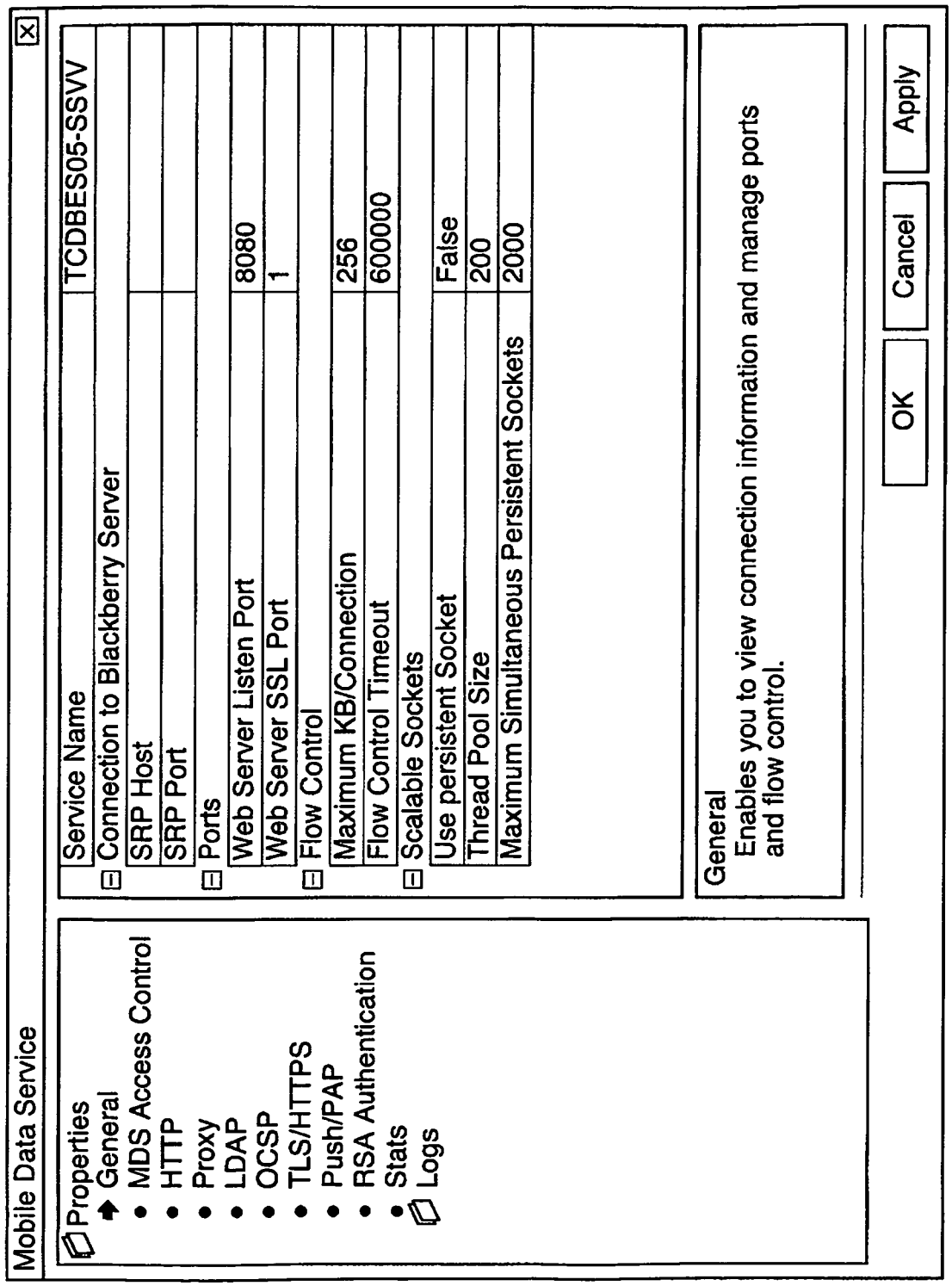
FIG. 16B shows a "Mobile Data Services Properties" page on the user interface.

At step 69, the script clicks on the "Edit Properties" link and the "verifyWindowContent" module is called to ensure that a "Mobile Data Service Properties" dialogue box is displayed that contains a number of links to windows in the left "explorer" pane. The script clicks on each link to ensure that the proper window is displayed. FIG. 16B shows the "Mobile Data Service Properties" page.

Figure 17A:
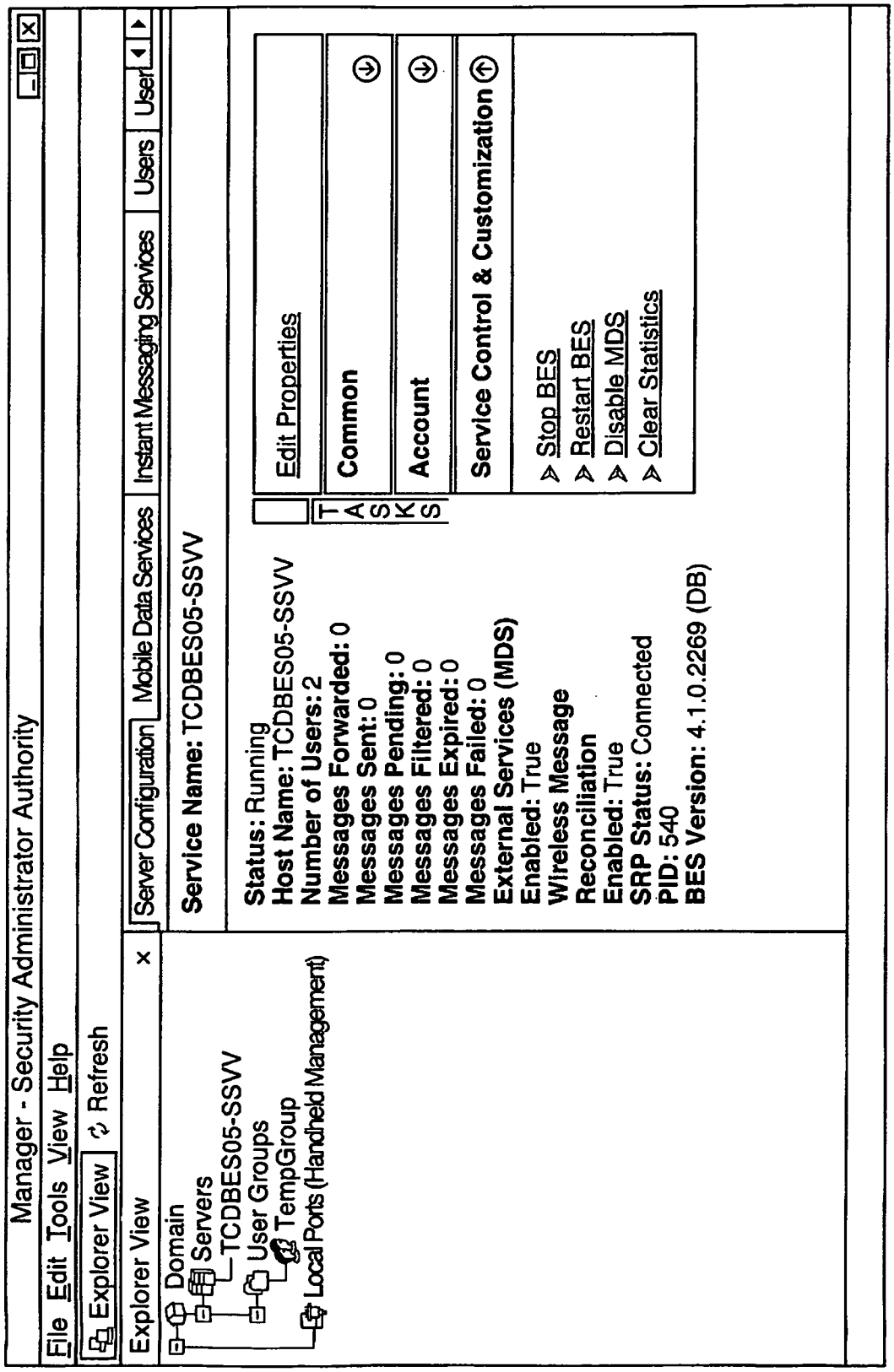
FIG. 17A shows a "Server Configuration" tab on the user interface.

At step 71, the script clicks on the "Server Configuration" tab and the "verifyWindowContent" module is called to ensure that the proper window is displayed for this tab. FIG. 17A shows the "Server Configuration" tab.

Figure 17B:
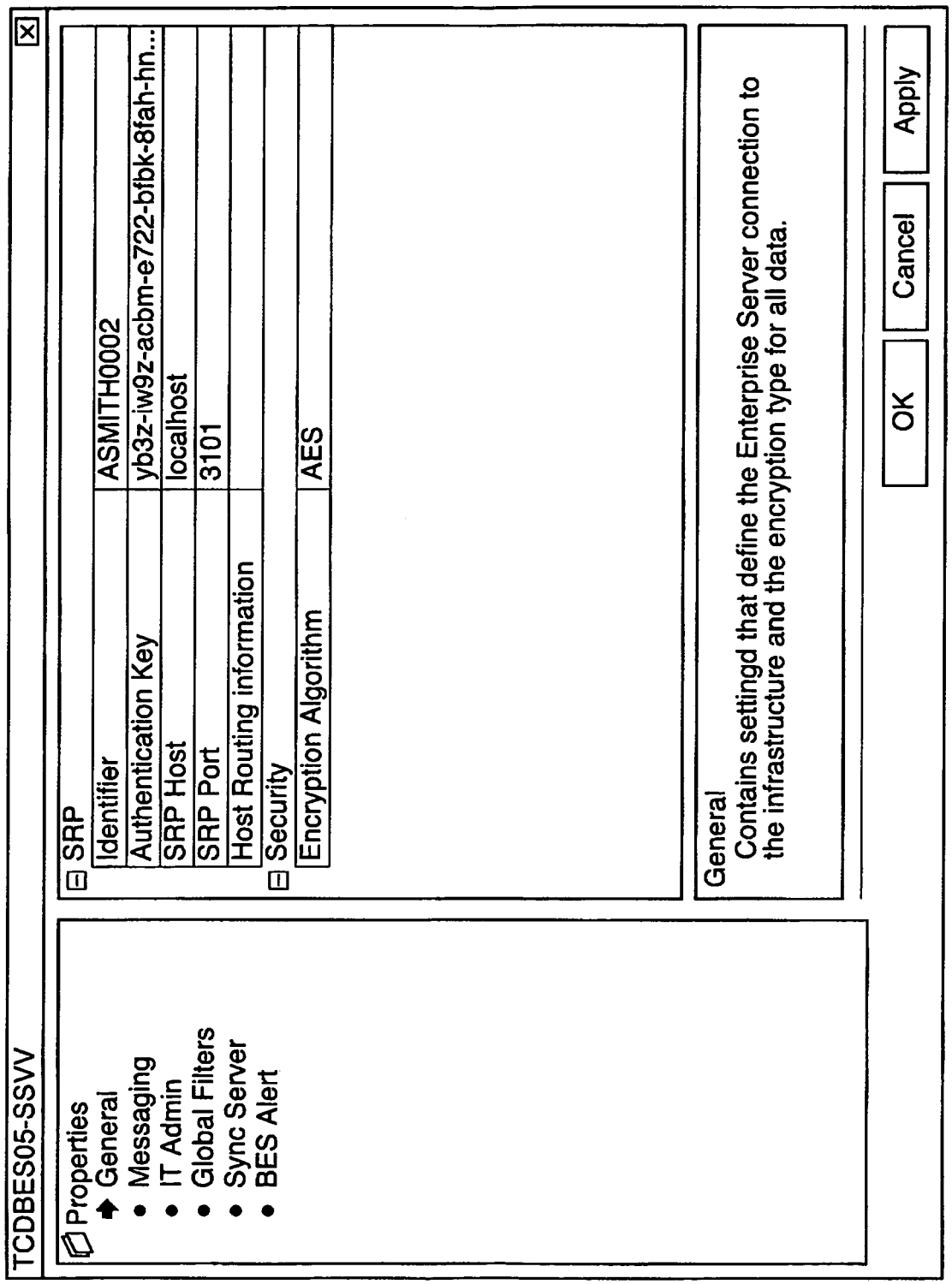
FIG. 17B shows a "Server Properties" page on the user interface.

Next, at step 73, the script clicks on the "Edit Properties" link. The "verifyWindowContent" module is called to ensure that a "Server Properties" dialogue box is displayed that contains a number of links to windows in the left "explorer" pane. The script clicks on each link to ensure that the proper window is displayed. FIG. 17B shows the "Server Properties" page.

Figure 17C:
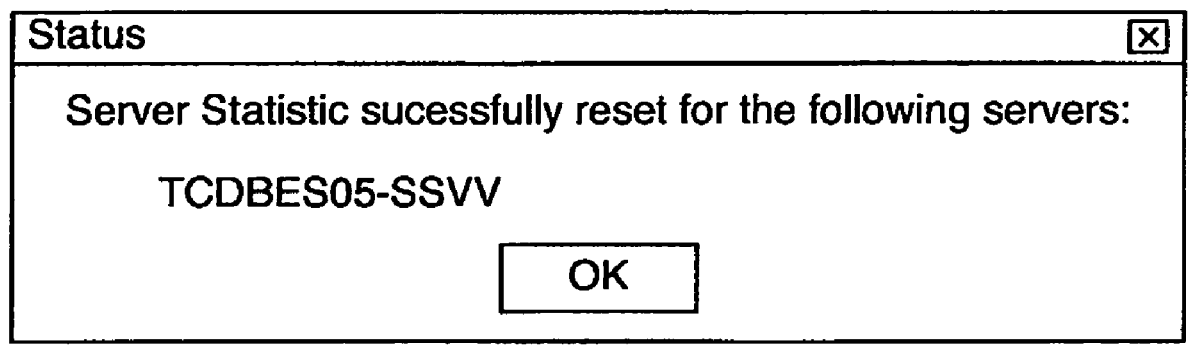
FIG. 17C shows a dialog box that is generated after the "Server Configuration" tab has been clicked.

At step 75, the script clicks on the "Clear Statistics" link and the "verifyWindowContent" module is again called to ensure that a dialogue box is displayed indicating that the statistics have been cleared for the server under test. FIG. 17C shows the dialogue after this link (seen in FIG. 17A) has been clicked.

Figure 18A:
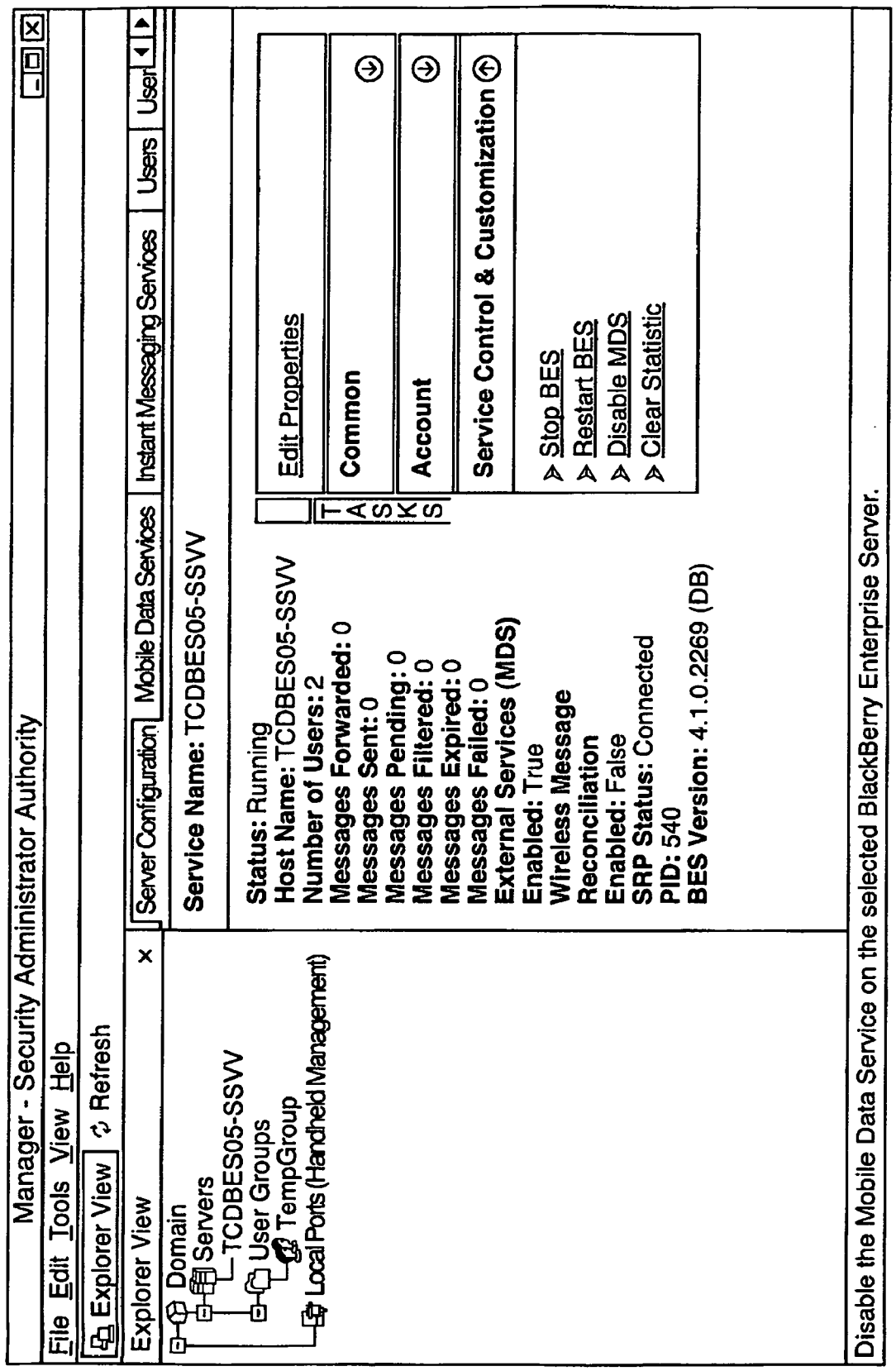
FIGS. 18A and 18B show toggling of a Mobile Data Services link in the user interface.
Figure 18B:
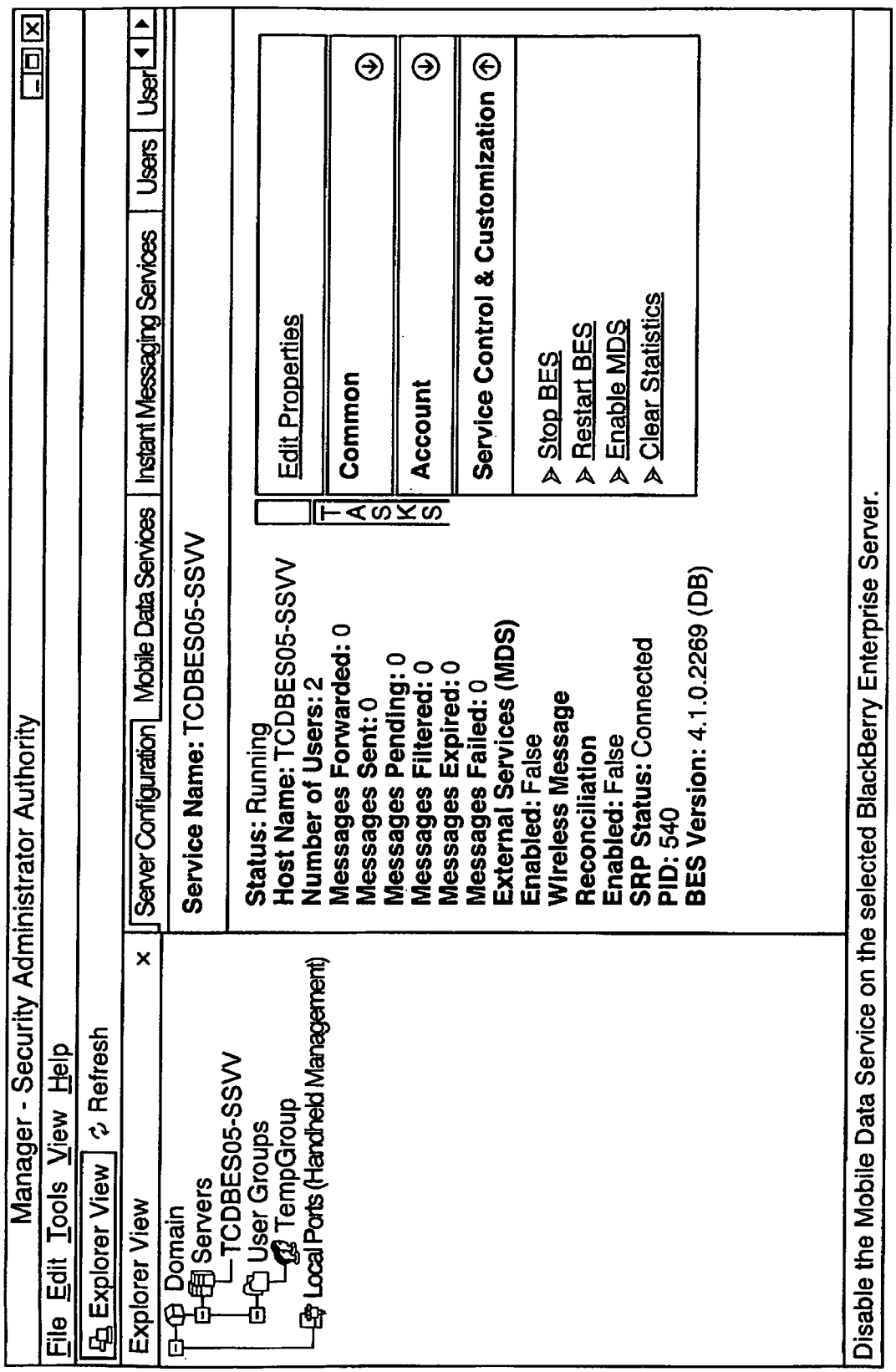

At step 77, the script clicks twice on the "Enable/Disable MDS" link and the "verifyWindowContent" module is again called to ensure that in response to the first click, "External Services (MDS) Enabled" goes from "True" to "False" and in response to the second click it, it becomes "True" again. FIGS. 18A and 18B show toggling of the "Enable/Disable MDS" task (i.e. it changes when clicked, as shown).

Figure 19A:
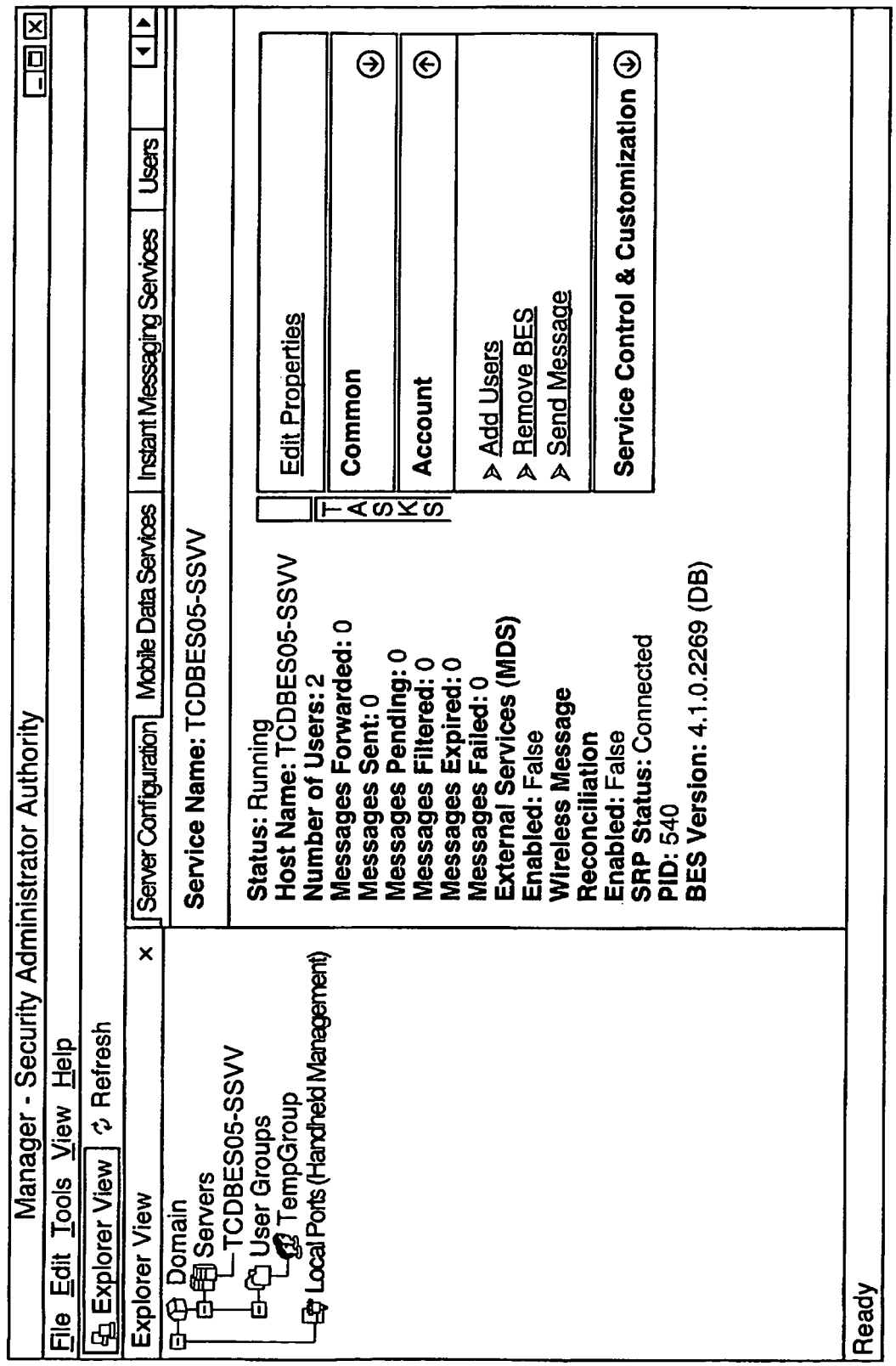
FIG. 19A shows the "Server Configuration" page on the user interface with a "Remove BES" link.

Then, at step 81, the script clicks on the "Remove BES" link (FIG. 19A), and the "verifyWindowContent" module is again called to ensure that a warning dialogue box is displayed asking the User if they are sure they want to remove the server (under test). In response to this dialog, the script selects "No".

Figure 20A:
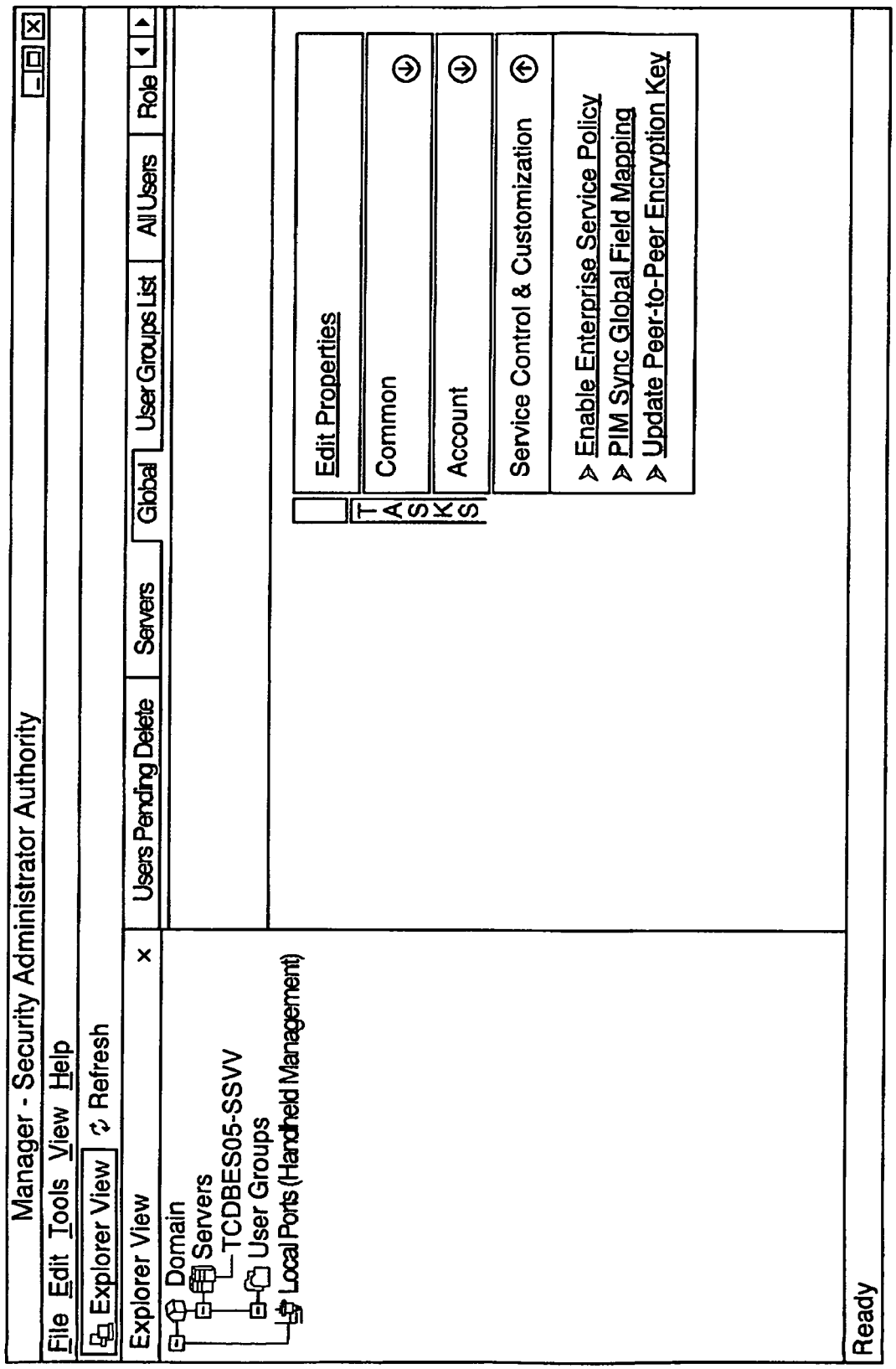
FIG. 20A shows a "Global" tab on the user interface.

At step 89, the script clicks on the "Global" and the "verifyWindowContent" module is called to ensure that the proper window is displayed for this tab. FIG. 20A shows the global tab.

Figure 20B:
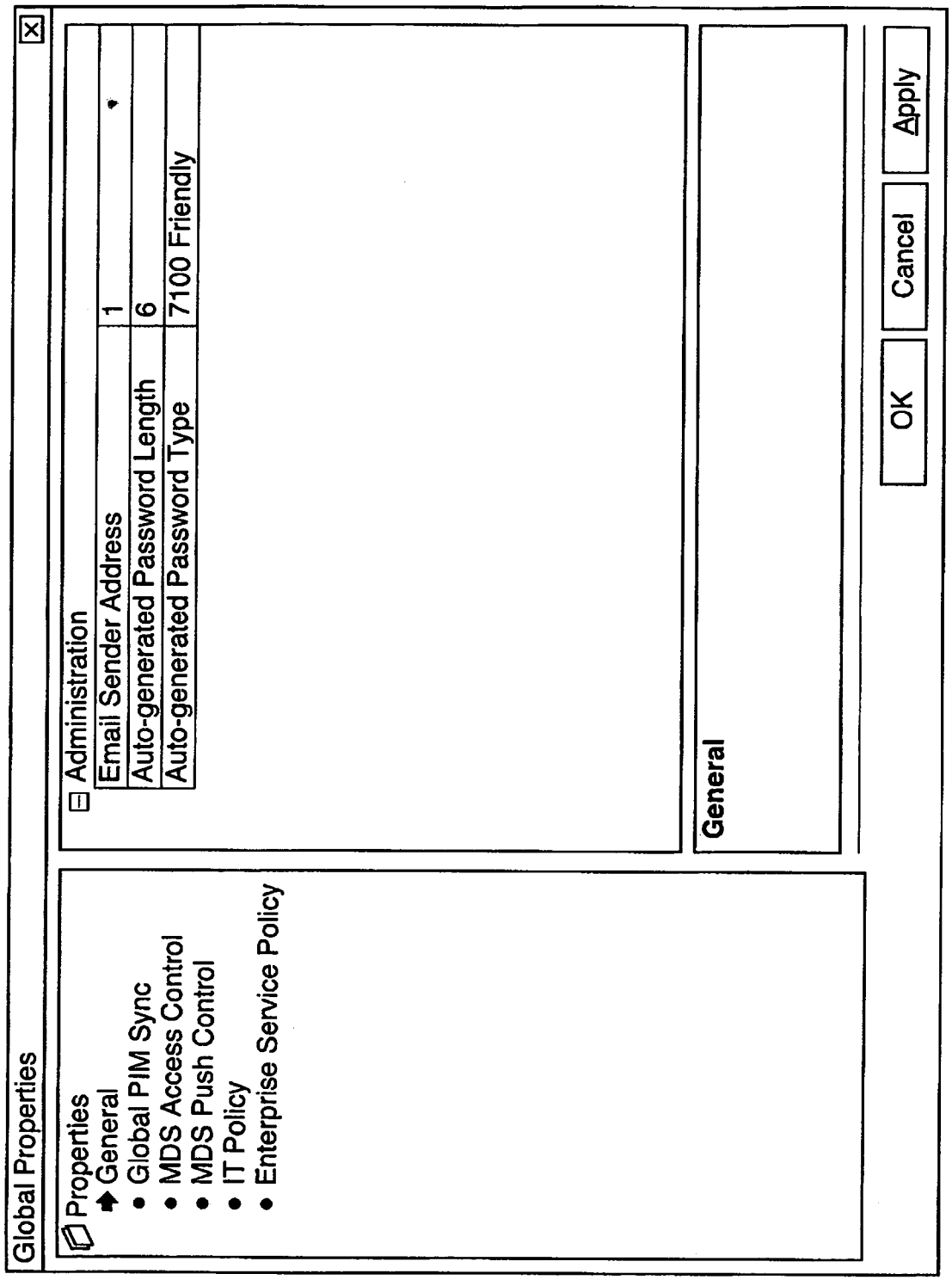
FIG. 20B shows a "Global Properties" dialog displayed via the user interface.

At step 91, the script clicks on the "Edit Properties" link and the "verifyWindowContent" module is called to ensure that a "Global Properties" dialogue box is displayed that contains a number of links to windows in the left "explorer" pane. The script then clicks on each link to ensure that the proper window is displayed. FIG. 20B shows global properties displayed via the user interface.

Figure 21:
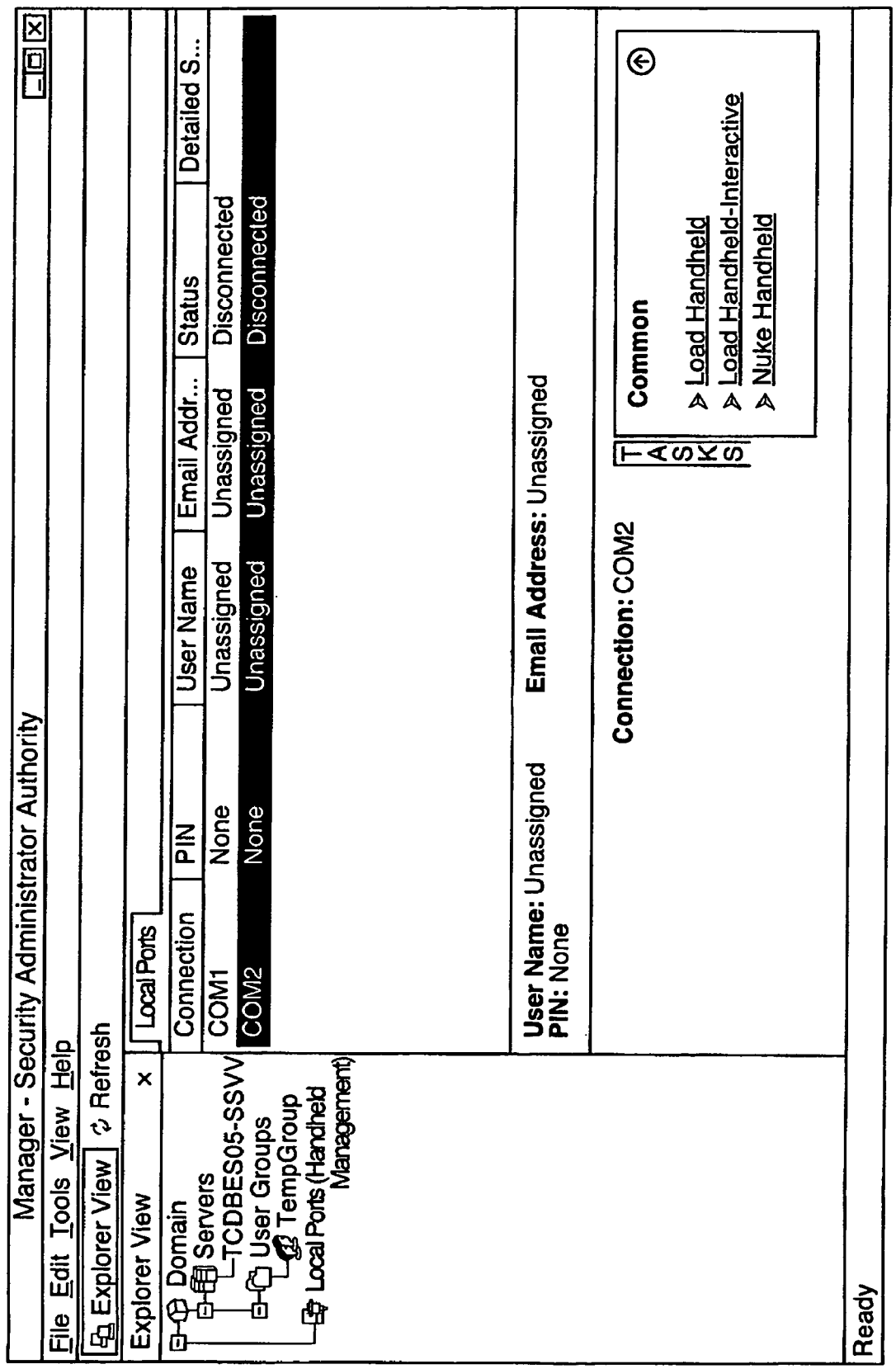
FIG. 21 shows a "Local Ports (Handheld Management)" explorer view selected on the user interface.

At step 93, the script clicks on the "Handheld Management" link in the "Explorer View" pane and the "verifyWindowContent" module is called to ensure that the proper window is displayed. FIG. 21 shows the "Local Ports (Handheld Management)" explorer view selected.

At step 95, the script clicks on the "Ports" link in the "Explorer View" pane and the "verifyWindowContent" module is called to ensure that the proper window is displayed (See FIG. 21).

Figure 22:
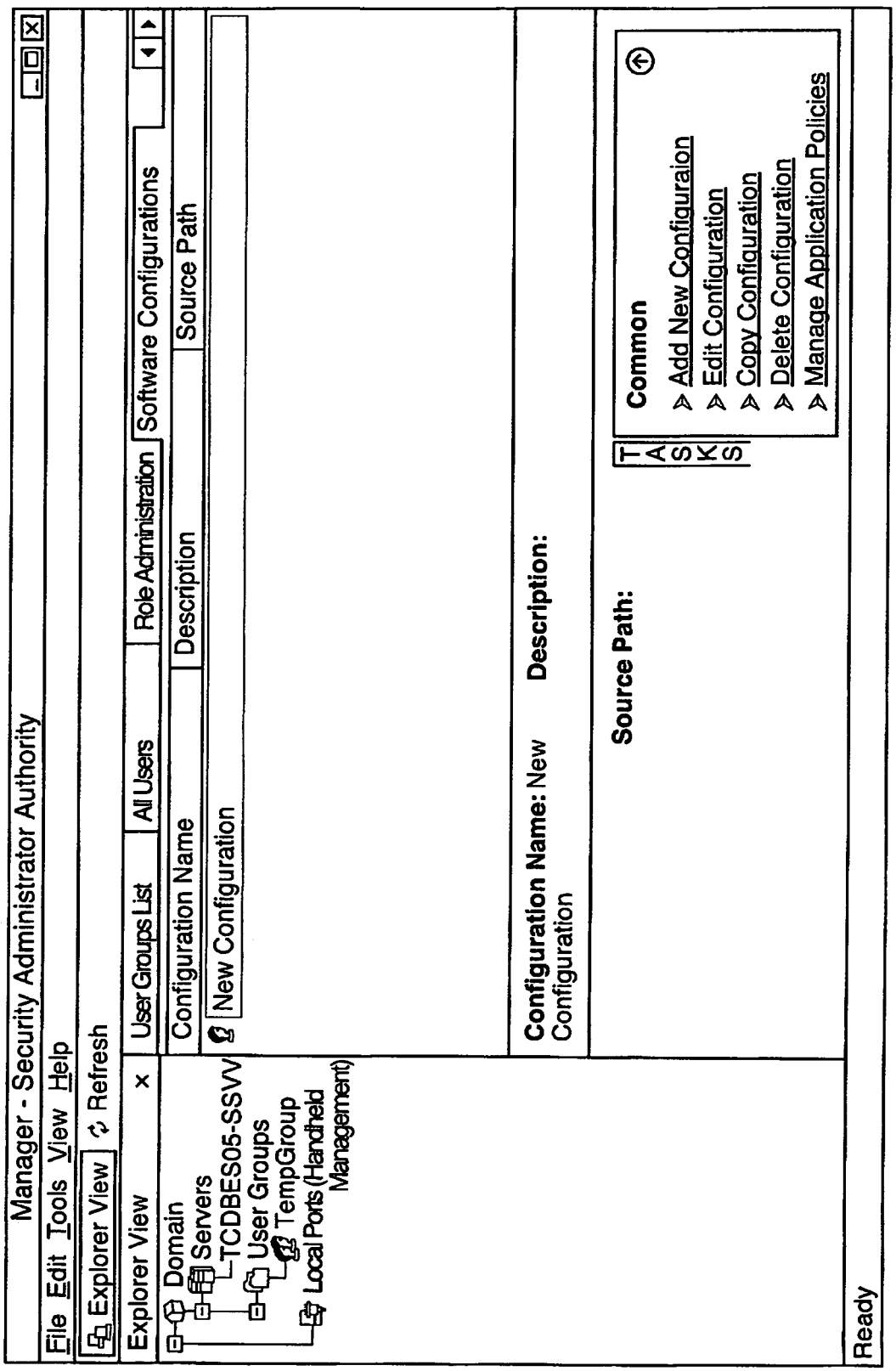
FIG. 22 shows a "new Configuration" display of the user interface.

At step 99, the script clicks on the "Software Configurations" tab at the "Domain" level of the "Explorer View" pane and the "verifyWindowContent" module is called to ensure that the proper window is displayed, as shown in FIG. 22.

The automated test script then ends and control is returned to the user for normal operation.

If the script detects an error, it logs the error to the log file referred to above. The script also detects any known issues or warnings that it encounters. Any unexpected behaviour is logged for review by a tester following execution. Upon script completion, an automated email is sent out to a list of users specified in the ini file which contains a summary of the results along with the log file attached. This ini file is read upon initialization of the script.

A sample ini file is as follows:

```
<ini file snip>
Platform=BESX
Manager Version=4.1.0.5
BES Name=TCDBES05-SSVV
Sample Email Address Format=TestUser@core.sqm.testnet.rim.com
License Key for BES=besx35-kjxjgm-jpvbbp-ptj08j-f1xjp0
\\ database information for the BES
Database Server Name=10.11.138.122
Database Name=BESMgmt
Authentication=Windows Authentication
\\after mapping the User List to the List View object, record the
object index here
Object Index of the User List=1
\\specify the recipients of the test results in the format below -
";" is the delimiter
Test results recipients=asmith@rim.com;NotesUser1@TCDBES04-
SSVV.core.sqm.testnet.rim.com
\\the SMTP server you will use to send test results
SMTP Server=10.101.90.59
BES name and version=dailybuild ExchangeBES_20050330
\\the reply to address for the results email
Reply to=asmith@rim.com
\\specify the number of users that you wish to have on the server
for the entire test
Number of users to leave on BES=0
</snip>
```

A person skilled in the art, having read this description of the preferred embodiment may conceive of variations and alternative embodiments.

All such variations and alternative embodiments are believed to be within the ambit of the claims appended hereto.

What is claimed is:

1. A method of testing administration software in a communication system having at least one enterprise server for facilitating communications and delivery of services to users of handheld mobile communication devices and an administrative program comprising said administration software for managing said at least one enterprise server, the method comprising executing an automated script adapted to test operation of said administration software, the method further comprising:

automatically executing operations and verifying results of said operations;
wherein said operations comprise controlling a user interface of said administration software to verify correct operation of at least one of menu options, buttons, and links;
wherein said verifying results of said operations includes checking databases and log files of said at least one enterprise server to ensure correct updating responsive to execution of said operations; and
wherein said automated script calls a plurality of modules for performing specific functions, said functions comprising at least one of adding said users of handheld mobile communication devices to said enterprise server, deleting said users of handheld mobile communication devices from said enterprise server, verifying contents of a user interface generated by said administration software in response to said operations of said script, and checking databases and log files of said at least one enterprise server to ensure correct updating responsive to execution of said operations.

2. The method of claim 1, wherein said functions comprises a function that searches said administration software for all of its components, collects all version numbers thereof, populates variables within said script, and verifies versions of software components of said administration program.

3. The method of claim 2, wherein said functions comprise a second function for comparing said variables to data displayed by said user interface generated by administration software.

4. The method of claim 1, wherein said functions comprise a function that builds a list of every user on said at least one enterprise server.

5. The method of claim 4, wherein said list is created using an open-source utility function.

6. The method of claim 4, wherein said functions comprise a second function that automatically adds users from said list of users, and verifies that the users have been added correctly by examining the content of a User List displayed by the user interface and data contained within said databases and log files.

7. The method of claim 6, wherein said functions comprise a third function that automatically deletes said users from said list of users, and verifies that the users have been deleted by examining the content of said User List displayed by the user interface and data contained within said databases and log files.

8. The method of claim 4, wherein said functions comprise a fourth function for verifying contents of HTML frames displayed by said user interface.

9. The method of claim 1, wherein said functions comprise a function for checking said databases using SQL for each operation performed by the administration software that causes a change in said databases.

10. The method of claim 1, wherein said functions comprise a function for accessing said log files after operations performed by the administration software that cause interaction with said at least one enterprise server, such that when a specific operation is performed the function parses the log files to ensure that proper entries are added.

11. The method of claim 2, wherein said functions comprise a function that builds a list of every user on said at least one enterprise server.

12. The method of claim 3, wherein said functions comprise a function that builds a list of every user on said at least one enterprise server.

13. The method of claim 11, wherein said list is created using an open-source utility function.

14. The method of claim 12, wherein said list is created using an open-source utility function.

15. The method of claim 11, wherein said functions comprise a second function that automatically adds users from said list of users, and verifies that the users have been added correctly by examining the content of a User List displayed by the user interface and data contained within said databases and log files.

16. The method of claim 12, wherein said functions comprise a second function that automatically adds users from said list of users, and verifies that the users have been added correctly by examining the content of a User List displayed by the user interface and data contained within said databases and log files.

17. The method of claim 5, wherein said functions comprise a second function that automatically adds users from said list of users, and verifies that the users have been added correctly by examining the content of a User List displayed by the user interface and data contained within said databases and log files.

18. The method of claim 13, wherein said functions comprise a second function that automatically adds users from said list of users, and verifies that the users have been added correctly by examining the content of a User List displayed by the user interface and data contained within said databases and log files.

19. The method of claim 14, wherein said functions comprise a second function that automatically adds users from said list of users, and verifies that the users have been added correctly by examining the content of a User List displayed by the user interface and data contained within said databases and log files.

20. The method of claim 15, wherein said functions comprise a third function that automatically deletes said users from said list of users, and verifies that the users have been deleted by examining the content of said User List displayed by the user interface and data contained within said databases and log files.

21. The method of claim 16, wherein said functions comprise a third function that automatically deletes said users from said list of users, and verifies that the users have been deleted by examining the content of said User List displayed by the user interface and data contained within said databases and log files.

22. The method of claim 17, wherein said functions comprise a third function that automatically deletes said users from said list of users, and verifies that the users have been deleted by examining the content of said User List displayed by the user interface and data contained within said databases and log files.

23. The method of claim 18, wherein said functions comprise a third function that automatically deletes said users from said list of users, and verifies that the users have been deleted by examining the content of said User List displayed by the user interface and data contained within said databases and log files.

24. The method of claim 19, wherein said functions comprise a third function that automatically deletes said users from said list of users, and verifies that the users have been deleted by examining the content of said User List displayed by the user interface and data contained within said databases and log files.

* * * * *